US012592934B2

(12) United States Patent
Sleeman et al.

(10) Patent No.: US 12,592,934 B2
(45) Date of Patent: Mar. 31, 2026

(54) MANAGING APPROVAL WORKFLOWS FOR PRIVILEGED ROLES IN PRIVATE LABEL CLOUD REALMS

(71) Applicant: Oracle International Corporation, Redwood Shores, CA (US)

(72) Inventors: Martin John Sleeman, Redmond, WA (US); Ashutosh B. Pitre, Dublin, CA (US); Jeremiah David Small, Wesford, MA (US); Aditya Uday Shanbhag, Seattle, WA (US); Gregg Wilson, Austin, TX (US); Hio-Wai Lao, Castro Valley, CA (US); Gokulnath Sundararajan, San Francisco, CA (US); Manoj Kumar, Gurgaon (IN); Anithalakshmi Thiagarajan, Bangalore (IN); MaheshKumar Peddoju, Bangalore (IN); Thomas James Andrews, Seattle, WA (US); Girish Nagaraja, Sammamish, WA (US); Brian Irl Pratt, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 71 days.

(21) Appl. No.: 18/598,083

(22) Filed: Mar. 7, 2024

(65) Prior Publication Data

US 2025/0286895 A1     Sep. 11, 2025

(51) Int. Cl.
*H04L 9/40*          (2022.01)

(52) U.S. Cl.
CPC ................................. *H04L 63/105* (2013.01)

(58) Field of Classification Search
CPC ..... H04L 63/105; H04L 63/20; H04L 63/102; G06F 21/6218; G06F 21/604
See application file for complete search history.

(56) References Cited

U.S. PATENT DOCUMENTS

| | | | |
|---|---|---|---|
| 8,113,959 B2 * | 2/2012 | de Judicibus | A63F 13/52 |
| | | | 715/731 |
| 8,161,173 B1 * | 4/2012 | Mishra | G06F 9/468 |
| | | | 709/227 |
| 8,214,398 B1 * | 7/2012 | Cowan | G06F 21/6218 |
| | | | 707/787 |
| 10,061,932 B1 * | 8/2018 | Combs | H04N 1/4486 |
| 10,089,476 B1 * | 10/2018 | Roth | G06Q 20/14 |
| 10,122,717 B1 * | 11/2018 | Reddy | G06F 21/604 |
| 10,270,759 B1 * | 4/2019 | Bordelon | G06F 9/4843 |
| 10,974,516 B2 * | 4/2021 | Moriya | B41J 2/17566 |
| 11,323,477 B1 * | 5/2022 | Kumar | H04L 63/168 |
| 11,587,458 B2 * | 2/2023 | Lowensohn | B65D 77/0453 |
| 11,954,238 B1 * | 4/2024 | Tan | H04L 9/0891 |

(Continued)

*Primary Examiner* — David Garcia Cervetti
(74) *Attorney, Agent, or Firm* — Invoke

(57) ABSTRACT

Techniques for access management with role containers are disclosed. Role containers comprise a set of roles such as service roles, application roles, and domain roles. A role container can be assigned to an operator, or a group of operators, using an assignment workflow and can then be activated using an activation workflow. Roles in the role container may include requestable roles and conditional roles. By providing collections of roles in role containers, management can be facilitated on a user or group basis.

24 Claims, 14 Drawing Sheets

(56) References Cited

U.S. PATENT DOCUMENTS

| | | | |
|---|---|---|---|
| 12,021,888 B1 * | 6/2024 | Reed | G06F 9/455 |
| 12,143,917 B2 * | 11/2024 | Raffa | H04M 3/566 |
| 12,164,652 B1 * | 12/2024 | Li | G06F 21/6218 |
| 12,363,148 B1 * | 7/2025 | Nanduri | G06F 21/57 |
| 2002/0026592 A1 * | 2/2002 | Gavrila | G06F 21/6218 709/229 |
| 2007/0124374 A1 * | 5/2007 | Arun | G06Q 10/10 709/204 |
| 2009/0164499 A1 * | 6/2009 | Samudrala | G06F 21/604 707/999.102 |
| 2009/0165078 A1 * | 6/2009 | Samudrala | G06F 21/604 726/1 |
| 2009/0205018 A1 * | 8/2009 | Ferraiolo | H04L 63/102 707/999.103 |
| 2010/0153865 A1 * | 6/2010 | Barnes | H04L 67/10 715/762 |
| 2011/0277017 A1 * | 11/2011 | Ivanov | H04L 63/08 726/4 |
| 2014/0095546 A1 * | 4/2014 | Kruglikov | G06F 3/067 707/784 |
| 2014/0188938 A1 * | 7/2014 | Banks | G06F 16/20 707/783 |
| 2015/0089575 A1 * | 3/2015 | Vepa | G06F 21/62 726/1 |
| 2015/0106736 A1 * | 4/2015 | Torman | G06F 3/04842 715/745 |
| 2016/0110553 A1 * | 4/2016 | Factor | H04L 63/101 726/30 |
| 2016/0139737 A1 * | 5/2016 | Conn | G06F 3/0481 715/802 |
| 2016/0294881 A1 * | 10/2016 | Hua | H04L 63/20 |
| 2017/0116334 A1 * | 4/2017 | Kruglikov | G06F 16/21 |
| 2017/0201525 A1 * | 7/2017 | Biller | H04L 63/08 |
| 2017/0323112 A1 * | 11/2017 | Tran | G06F 16/258 |
| 2019/0020659 A1 * | 1/2019 | Loni | H04L 63/105 |
| 2019/0149417 A1 * | 5/2019 | Augusto Lopes | H04L 41/0886 370/254 |
| 2019/0190917 A1 | 6/2019 | Joe | |
| 2019/0332789 A1 * | 10/2019 | Vandenbrouck | G06F 21/6218 |
| 2019/0334917 A1 * | 10/2019 | Demmler | G06Q 10/105 |
| 2019/0362087 A1 * | 11/2019 | Ferrans | H04L 63/102 |
| 2020/0389463 A1 * | 12/2020 | Chen | H04L 63/105 |
| 2021/0084048 A1 * | 3/2021 | Kannan | H04L 63/104 |
| 2021/0142276 A1 * | 5/2021 | Gupte | G06Q 10/06315 |
| 2021/0224409 A1 * | 7/2021 | Avanes | G06F 21/6218 |
| 2021/0226956 A1 * | 7/2021 | Wei | H04L 63/108 |
| 2021/0377276 A1 | 12/2021 | Dasari et al. | |
| 2021/0383325 A1 * | 12/2021 | Loupos | H04W 4/023 |
| 2022/0038449 A1 * | 2/2022 | Tripp | H04L 67/02 |
| 2022/0103566 A1 * | 3/2022 | Faulkner | H04L 67/06 |
| 2022/0116285 A1 * | 4/2022 | Abdollahi Vayghan | H04L 41/0668 |
| 2022/0129575 A1 * | 4/2022 | Goel | G06F 21/6218 |
| 2022/0159010 A1 * | 5/2022 | Bandarupalli | G06F 21/62 |
| 2022/0244949 A1 * | 8/2022 | Iqbal | G06F 9/547 |
| 2022/0405152 A1 * | 12/2022 | Edamadaka | G06F 3/0482 |
| 2023/0068221 A1 * | 3/2023 | Magowan | H04L 9/3247 |
| 2023/0086475 A1 * | 3/2023 | Mosko | H04L 63/104 726/1 |
| 2023/0104368 A1 * | 4/2023 | Miriyala | G06F 9/547 726/1 |
| 2023/0110527 A1 * | 4/2023 | Bhat | H04L 63/104 726/4 |
| 2023/0116463 A1 * | 4/2023 | Rath | H04L 63/083 726/22 |
| 2023/0224304 A1 * | 7/2023 | Lukanov | H04L 63/0853 726/1 |
| 2023/0370461 A1 | 11/2023 | Kalley et al. | |
| 2024/0015164 A1 * | 1/2024 | Guy | H04L 41/0893 |
| 2024/0015165 A1 * | 1/2024 | Guy | H04L 41/0893 |
| 2024/0053973 A1 * | 2/2024 | Ranganathan | G06F 8/63 |
| 2024/0069884 A1 * | 2/2024 | Majumdar | G06F 9/45558 |
| 2024/0095390 A1 * | 3/2024 | Chao | G06F 21/6227 |
| 2024/0103818 A1 * | 3/2024 | Gallagher | G06F 21/53 |
| 2024/0143351 A1 * | 5/2024 | Davis | G06F 21/31 |
| 2024/0171586 A1 * | 5/2024 | Jain | H04L 63/105 |
| 2024/0184465 A1 * | 6/2024 | Zwiegincew | G06F 3/067 |
| 2024/0205235 A1 * | 6/2024 | Batni | H04W 12/08 |
| 2024/0232408 A1 * | 7/2024 | Pan | G06F 21/604 |
| 2024/0244053 A1 * | 7/2024 | Tian | H04L 63/0245 |
| 2024/0275853 A1 * | 8/2024 | Singh | H04L 63/10 |
| 2024/0305622 A1 * | 9/2024 | Vijayan | H04L 63/0823 |
| 2024/0378307 A1 * | 11/2024 | Dcosta | G06F 21/604 |
| 2024/0378518 A1 * | 11/2024 | Sparrow | G06Q 10/103 |
| 2024/0414169 A1 * | 12/2024 | Fang | H04L 63/105 |
| 2025/0023844 A1 * | 1/2025 | Juneja | G06F 9/45558 |
| 2025/0077214 A1 * | 3/2025 | Banaal | G06F 8/65 |
| 2025/0106221 A1 * | 3/2025 | Wang | H04L 63/108 |

* cited by examiner

1410  Receive activation request for a role container.

1420  Verify role container has been assigned.

1430  Match request information with activation workflow(s).

1440  Select activation workflow.

1450  Traverse activation workflow.

1460  Verify all activation workflow requirements are met.

1470  Activate role container.

MANAGING APPROVAL WORKFLOWS FOR PRIVILEGED ROLES IN PRIVATE LABEL CLOUD REALMS

TECHNICAL FIELD

The present disclosure relates to systems and methods that provide dedicated or private label cloud (PLC) environments for use by tenants of a cloud infrastructure environment in accessing software products, services, or other offerings associated with the environment. In particular, the present disclosure relates to managing approval workflows for privileged business roles.

BACKGROUND

A cloud computing environment can be used to provide access to a range of complementary cloud-based components, such as software applications or services, which enable organizations or enterprise customers to operate their applications and services in a highly available hosted environment.

The benefits to an organization in moving their application and service needs to a cloud environment include a reduction in the cost and complexity of designing, building, operating, and maintaining their own on-premises data center, software application framework, or other information technology infrastructure.

In some cloud environments, services and products within a Private Label Cloud (PLC) are powered by computational resources mainly provided by the operators for their clients' use. Each PLC realm may include separate areas for the cloud provider, the operator, and their customers. This setup enables both the cloud provider and the operator to jointly manage the realm along with its products and services.

To secure and control access to specific resources in the cloud environment, an identity management service language is employed. Although this policy language is straightforward to write and interpret on an individual basis, managing permissions this way becomes cumbersome as the number of users and their required permissions increase. In such cases, continuing to use this policy language for managing privileges and access becomes impractical on a larger scale. For example, using policy language requires the definition and management of a vast number of rules and policies to accommodate the unique access needs of each user or role within an organization. This complexity can lead to errors in policy configuration, making it difficult to ensure that permissions are correctly applied across the entire user base. For example, in a large enterprise with various departments such as Sales, HR, and Engineering, each department may need access to different sets of resources. Defining granular access control policies for each user or role within these departments can become cumbersome and error-prone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one"

embodiment in this disclosure are not necessarily to the same embodiment, and they mean at least one. In the drawings.

DETAILED DESCRIPTION

Figure 1:
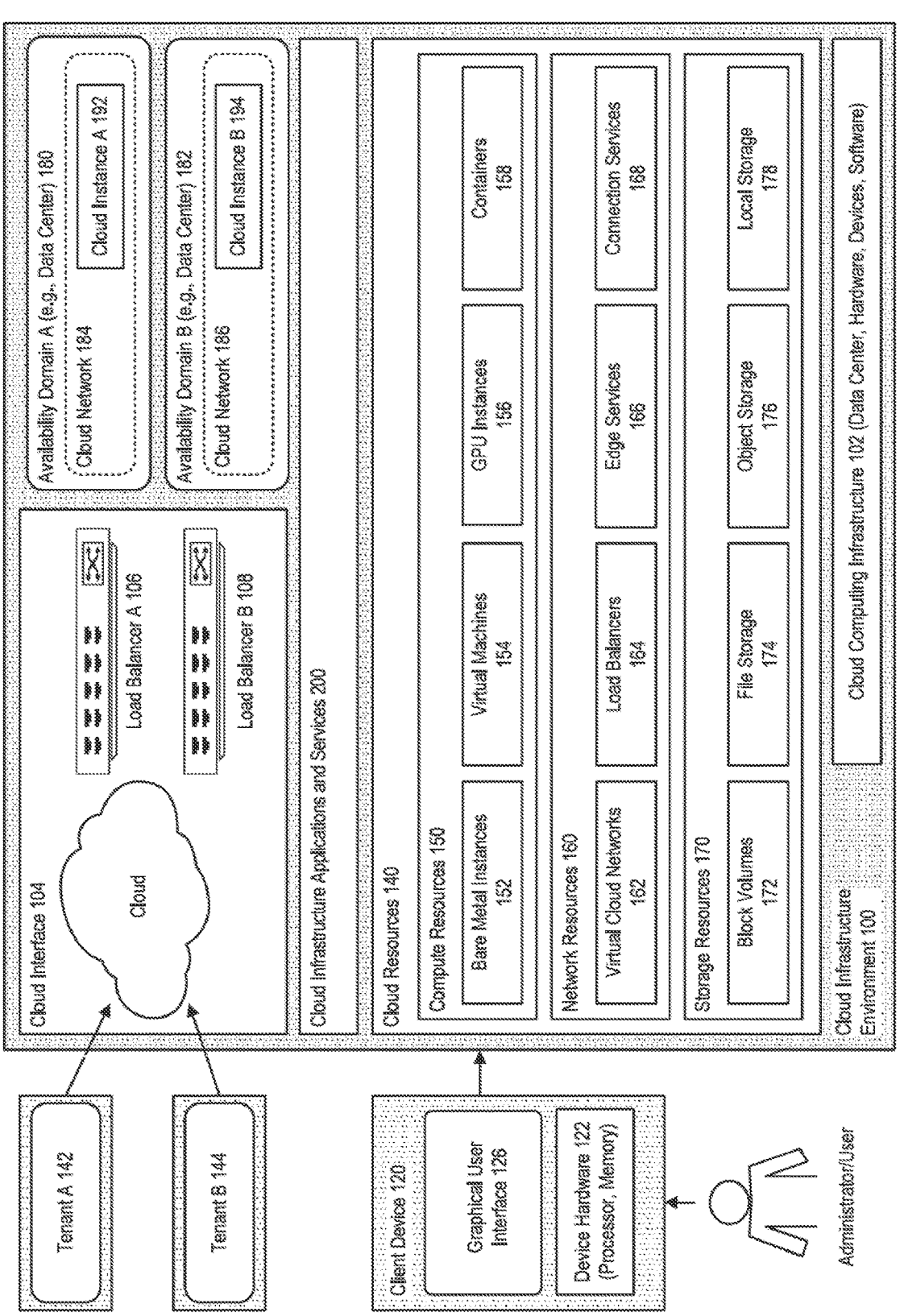
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. DEDICATED OR PRIVATE LABEL CLOUD ENVIRONMENTS
3. PRIVILEGED ROLE MANAGEMENT ARCHITECTURE
4. MANAGING PRIVILEGED ACCESS TO RESOURCES
5. EXAMPLE EMBODIMENT
6. MISCELLANEOUS; EXTENSIONS

1. General Overview

One or more embodiments use a role container to manage access to resources in a cloud computing environment. A role container includes a set of roles that may be of different types, each associated with access to a resource in the cloud computing environment. The system first selects and executes an assignment workflow associated with the role container to assign the role container to the operator. An embodiment includes an assignment workflow with multiple decision points requiring different criteria or inputs to determine the next step in the process. Once the assignment workflow has been completed, the role container is assigned to the operator but is not activated.

The system receives an activation request from an operator. In response, an embodiment selects and executes an activation workflow associated with the role container. The activation workflow may include multiple decision points that are different than the decision points for the assignment workflow. Once the system determines that the requirements of the workflow have been satisfied, the system activates the role container for the operator, allowing the operator to access resources associated with the role container.

One or more embodiments described in this Specification and/or recited in the claims may not be included in this General Overview section.

2. Dedicated or Private Label Cloud Environments

One or more embodiments provide features associated with dedicated or private label cloud (PLC) environments for use by tenants of a cloud infrastructure environment in accessing software products, services, or other offerings associated with the environment.

A cloud computing or cloud infrastructure environment can be used to provide access to a range of complementary cloud-based components, such as software applications or services, which enable organizations or enterprise customers to operate their applications and services in a highly available hosted environment.

The benefits to an organization in moving their application and service needs to a cloud infrastructure environment include a reduction in the cost and complexity of designing, building, operating, and maintaining their own on-premises data center, software application framework, or other information technology infrastructure.

Cloud Infrastructure Environments

Figure 2:
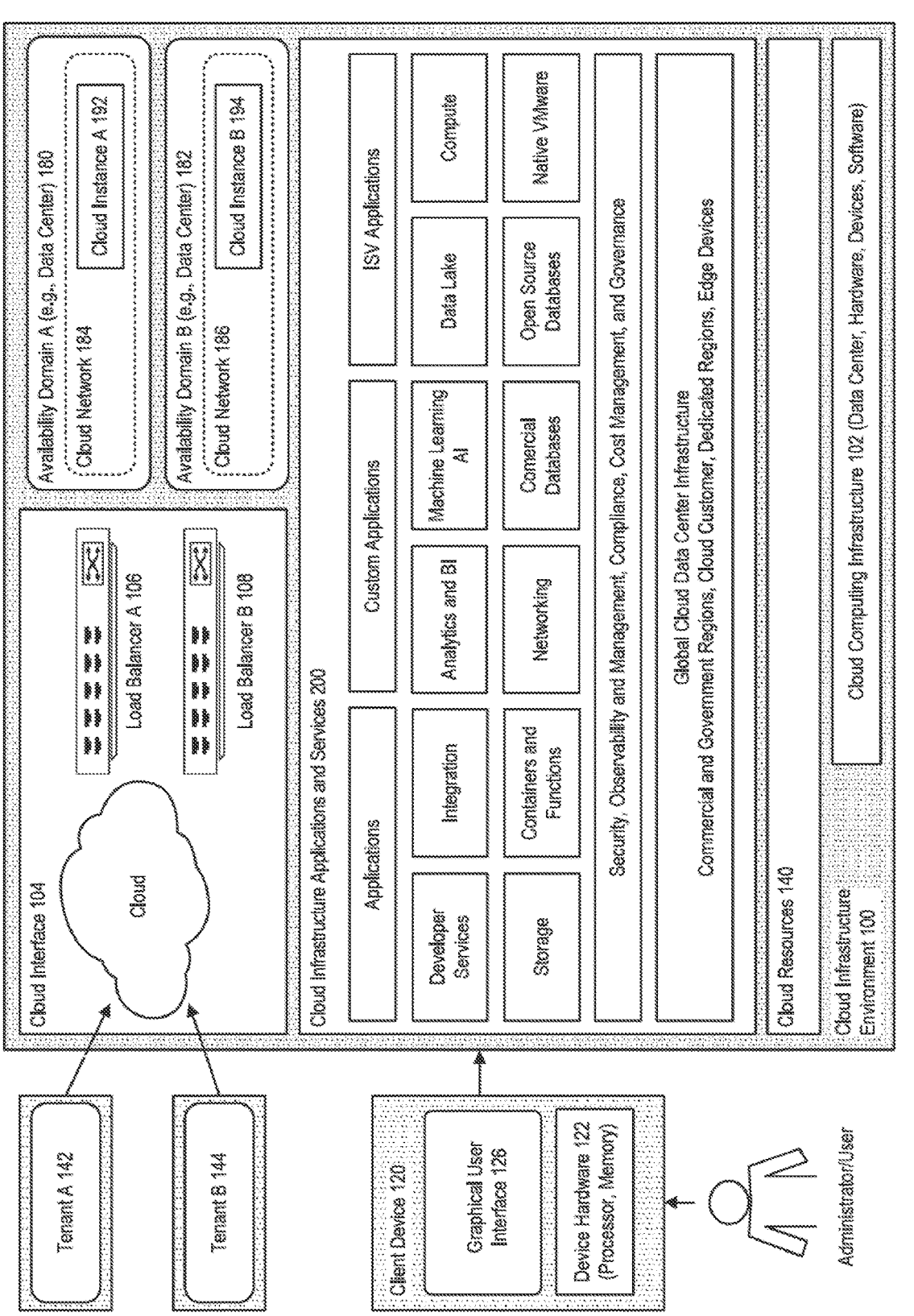
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, B 194. In an embodiment, availability A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, B 144, that provides a secure and isolated partition within the cloud infrastructure environment where the customer can create, organize, and administer their cloud resources. A cloud tenant/customer can access an availability domain and a cloud network to access each of their cloud instances. A tenancy in is isolated from other tenancies, ensuring that each customer's data and resources are secure and inaccessible to others. Within a tenancy, customers can create, manage, and organize a wide range of cloud resources, including compute instances, storage volumes, and networks. In Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources. A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, Containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-asa-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
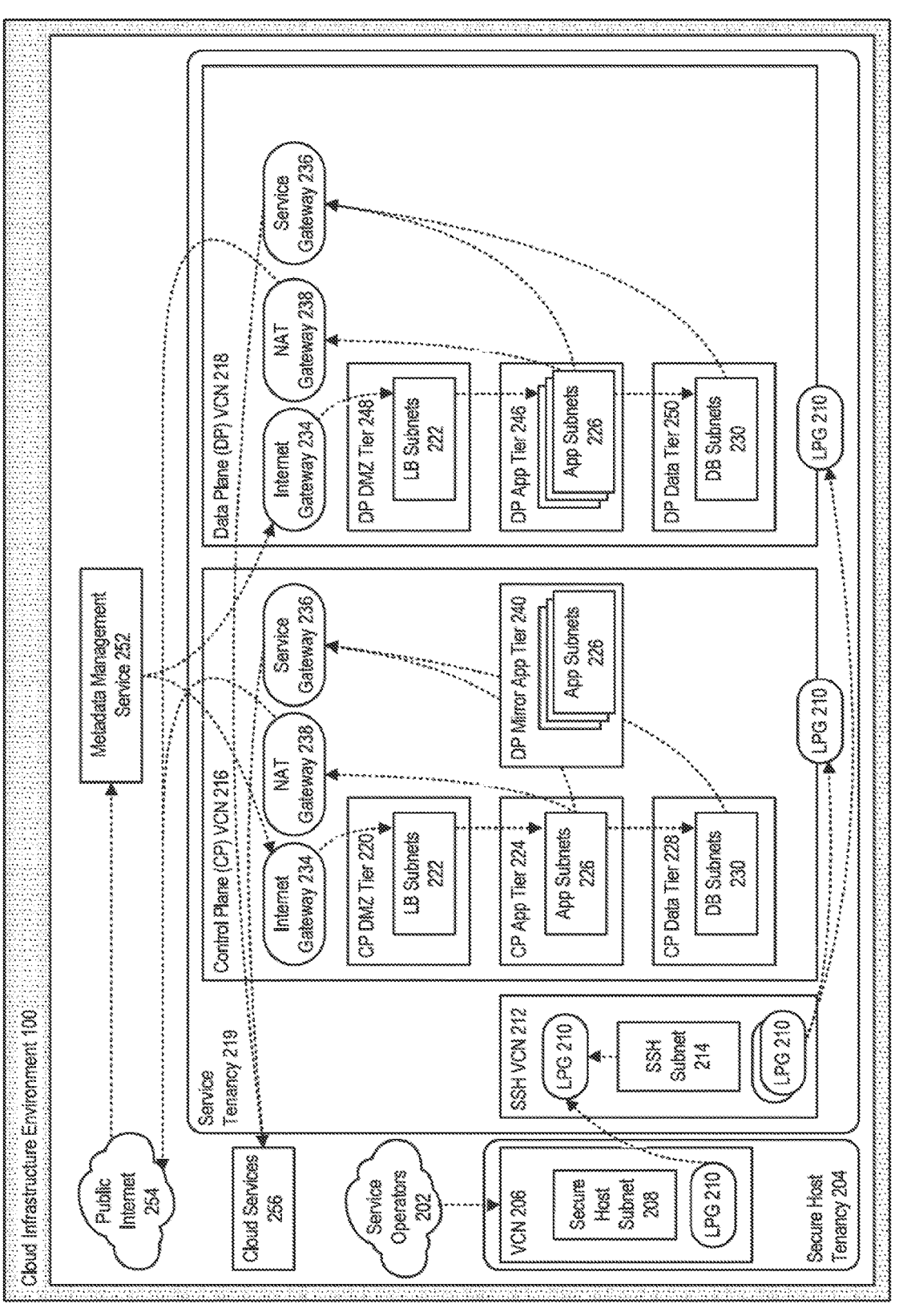
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as iOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
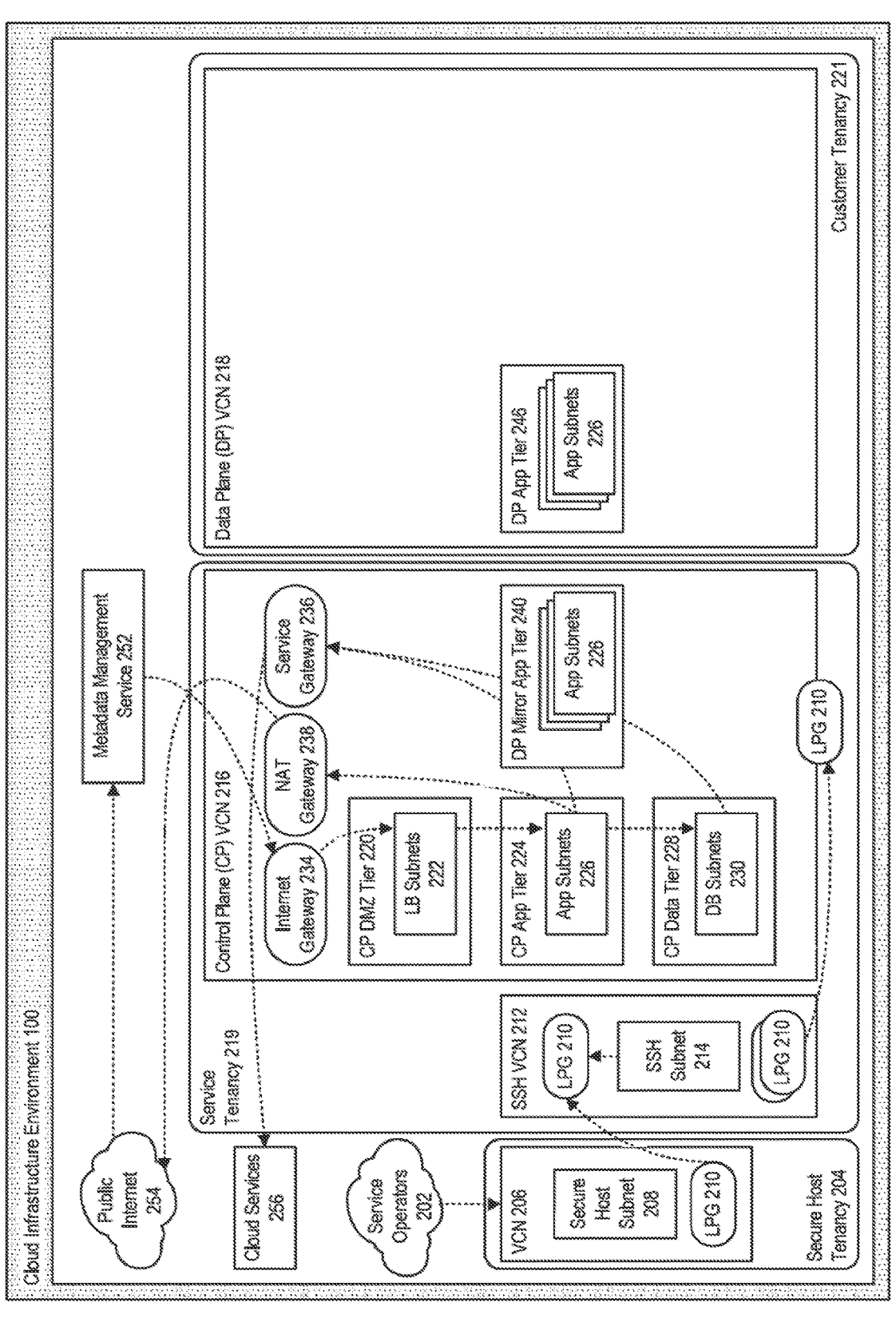
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
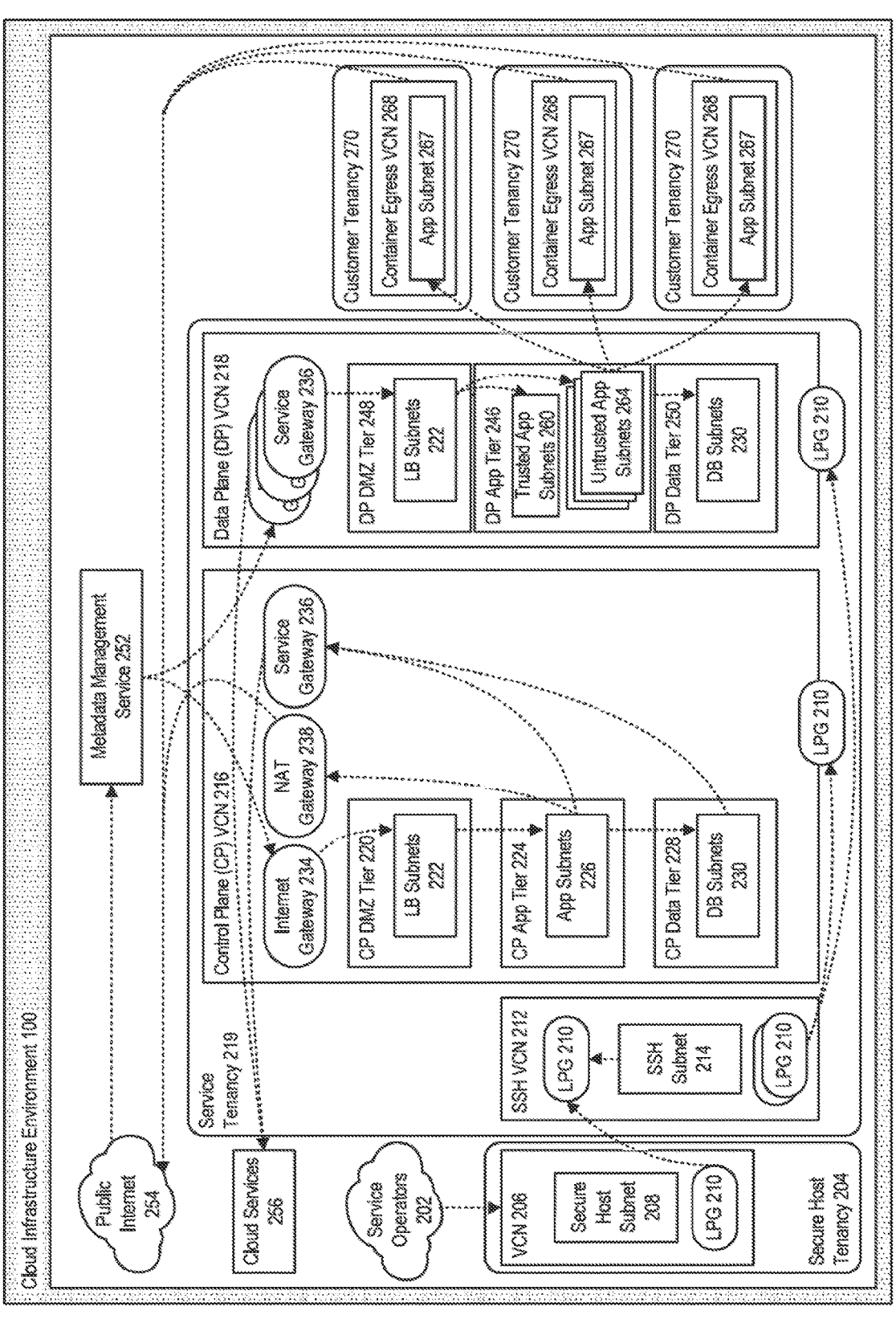
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
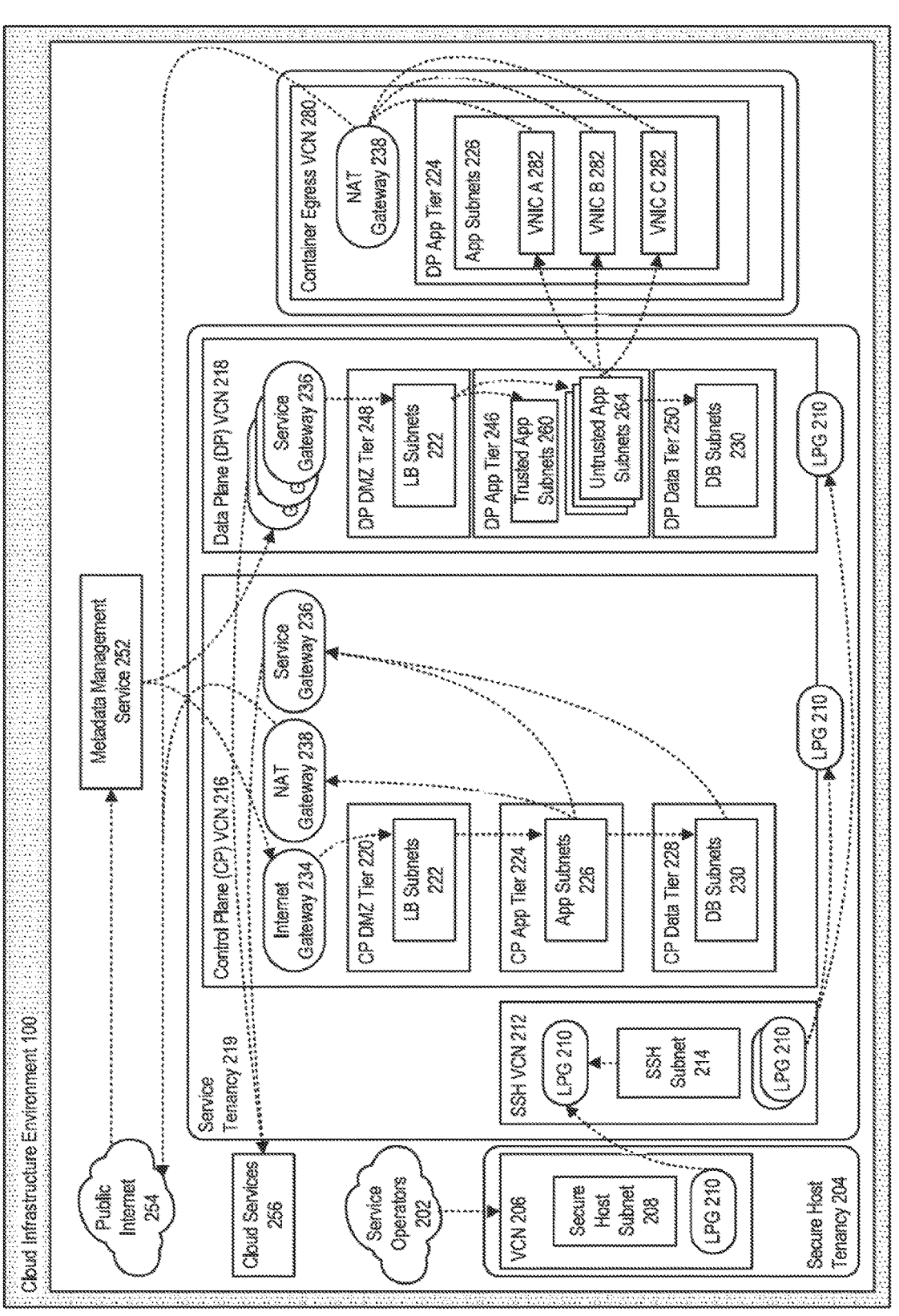
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
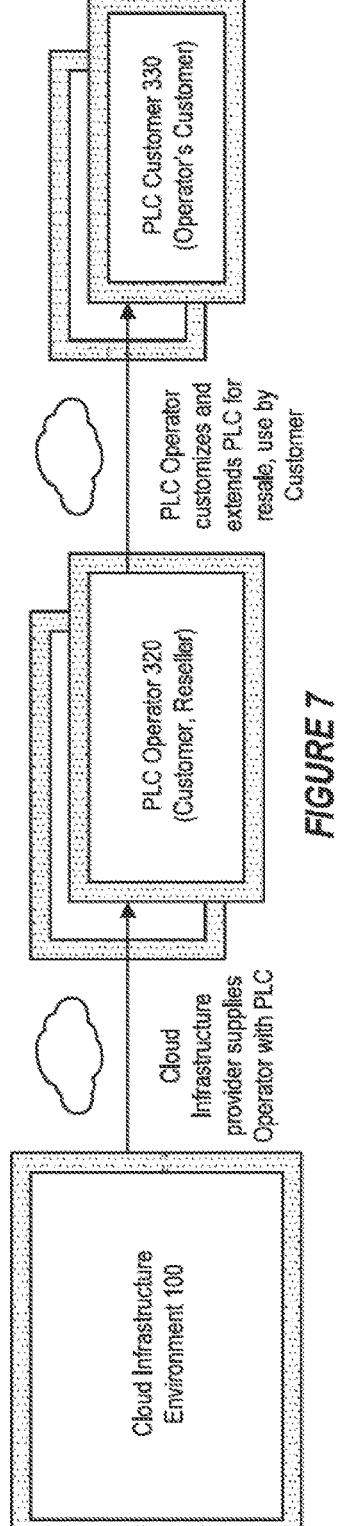
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., OCI) can supply a PLC operator 320, for example an OCI customer operating as a reseller, with one or more private label cloud (PLC) environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
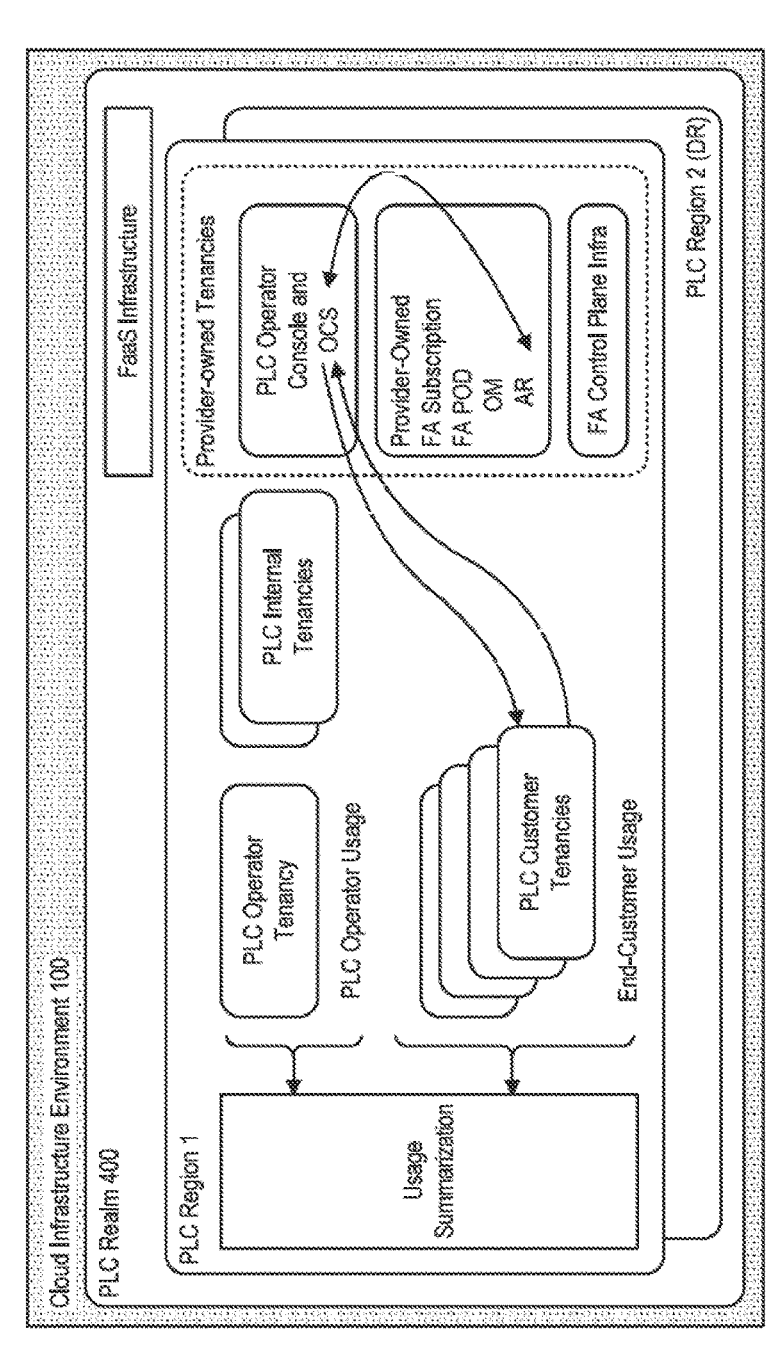
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, such as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of a cloud infrastructure environment, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
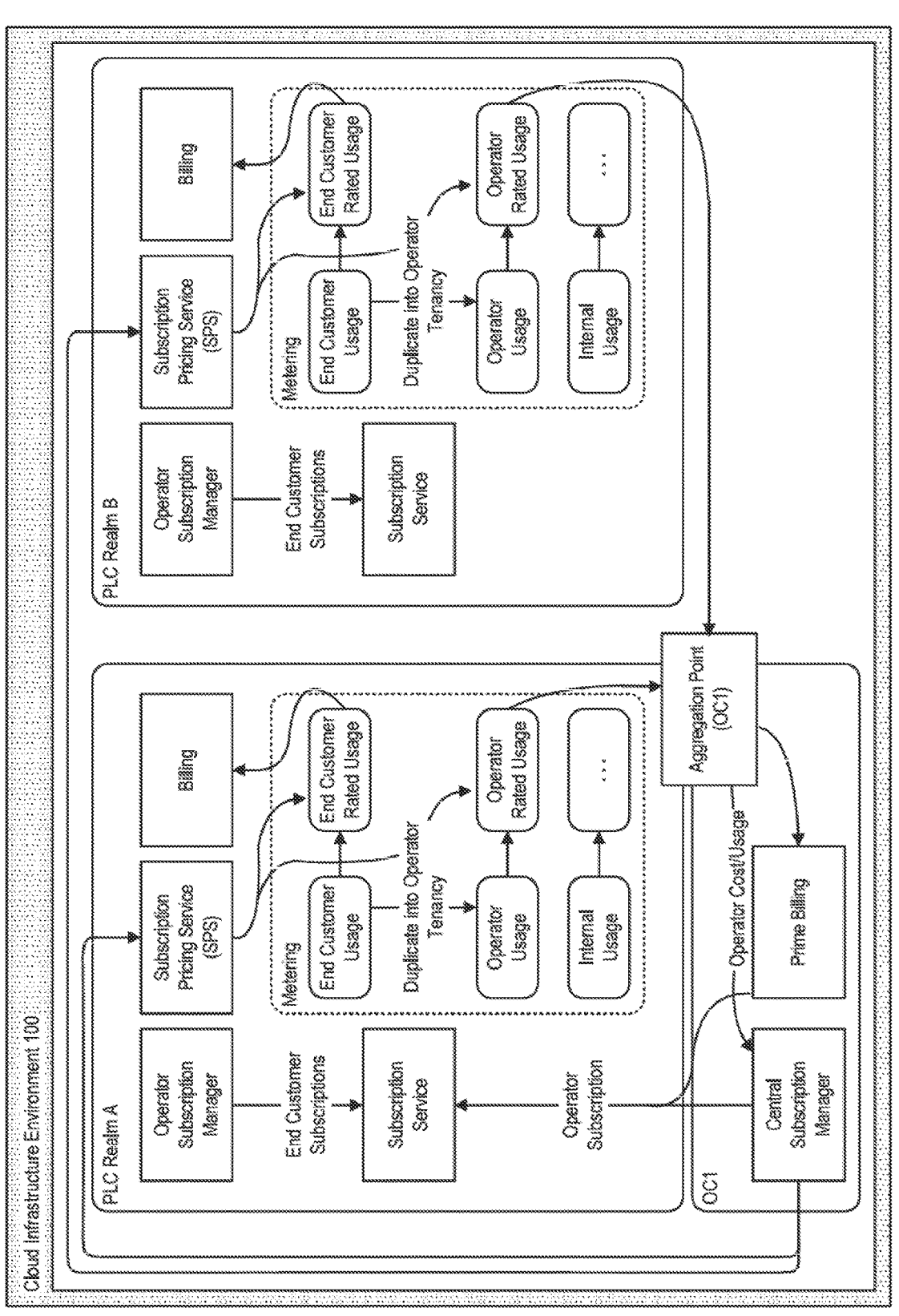
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, a cloud subscription service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in cloud subscription service that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
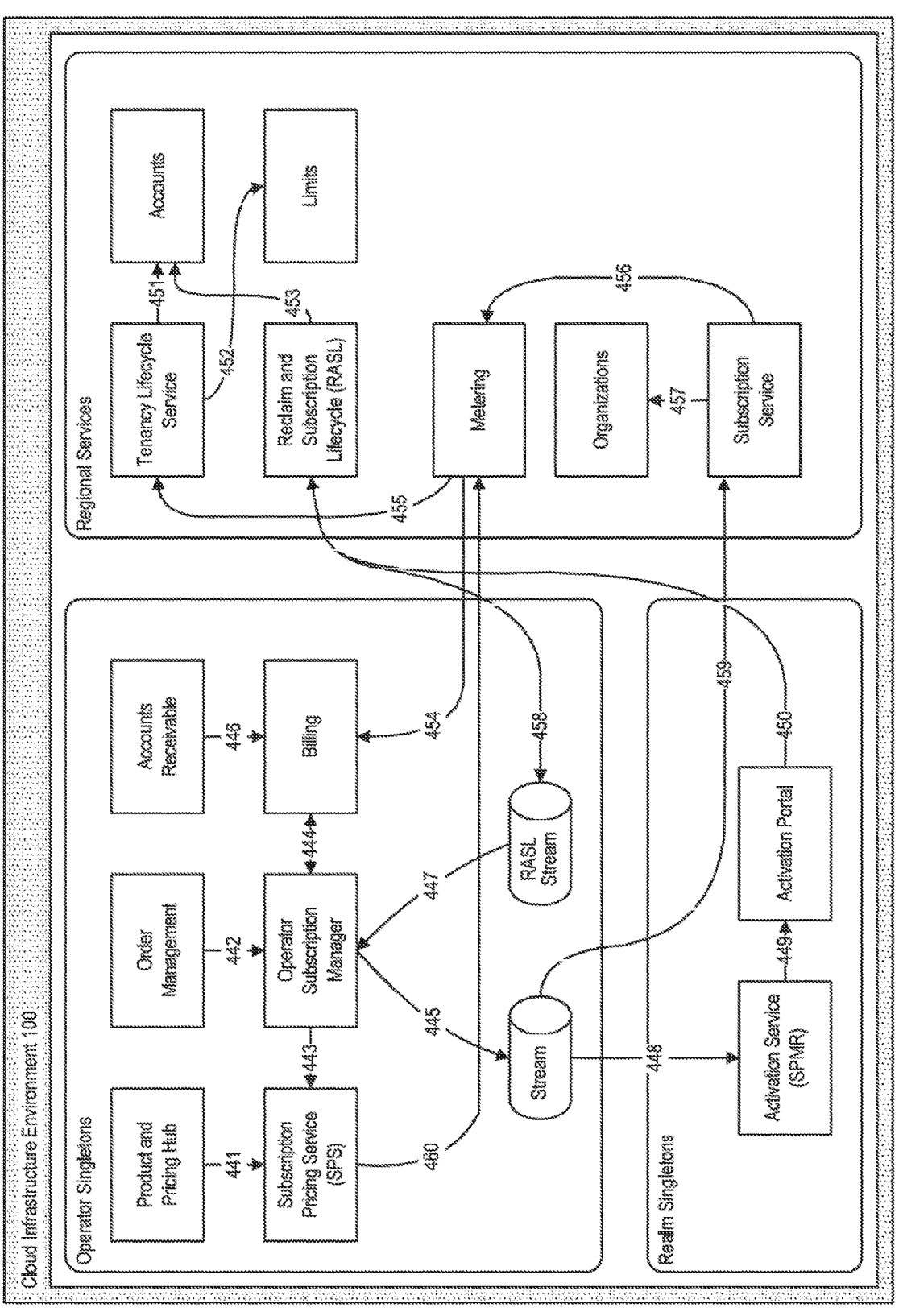
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The cloud subscription service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can sync product information from a product hub (e.g., an Oracle Fusion Product Hub) and a global price list from a pricing hub (e.g., an Oracle Fusion Pricing Hub).

In accordance with an embodiment, the cloud subscription service operates as an upstream service to receive new order requests, for example, from an Oracle Fusion Order Management environment. The cloud subscription service can provide subscription information to the SPS service. Subscription details like time of quote, configuration, and subscription type (Commitment, PayG) help SPS to determine an effective base price (Rate Card) for the subscription. The cloud subscription service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the cloud subscription service component to create subscriptions, rate cards, and billing accounts. At 443, pricing configuration and pricing rules are sent to SPS for new orders. At 444, the cloud subscription service is used to set up a billing account in the billing service or component. At 445, the cloud subscription service publishes events to an cloud infrastructure streaming component. At 446, charge data is sent to an accounts receivable component to generate invoices. At 447, cloud subscription service consumes reclaim and subscription lifecycle (RASL) events from cloud infrastructure streaming. At 448, an activation service reads the cloud subscription service event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads cloud subscription service event stream. At 459, the subscription service reads cloud subscription service event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

2. Privileged Role Management Architecture

Figure 11:
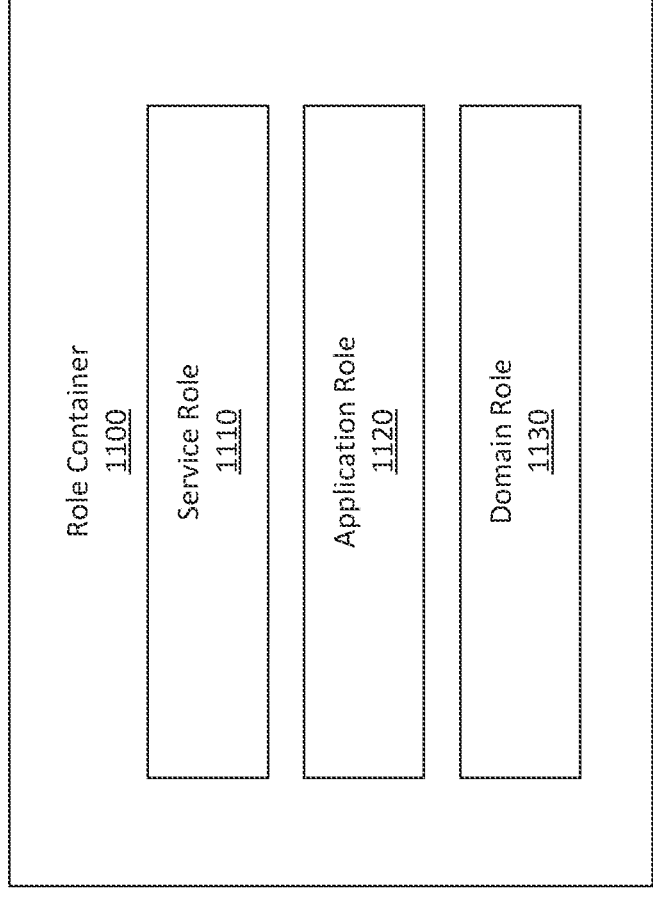
FIG. 11 illustrates a role container in accordance with one or more embodiments.

FIG. 11 illustrates a role container 1100 in accordance with one or more embodiments. A role container is a data structure that is associated with a set of roles that define a set of permissions that determine the actions an operator can perform within a system. A role container will includes a set of one or more roles. Roles may be created to manage and restrict access to sensitive information and critical functions. By assigning specific roles to operators, administrators can effectively control who can view, alter, or delete data as well as who can perform certain functions within the system.

In accordance with an embodiment, role container 1100 includes a service role such as service role 1110. A service role is associated with access to infrastructure as a service (IaaS) resources, particularly within the context of Oracle's IaaS offerings such as OCI and PLC. This type of role is often designed to grant permissions to automated services or applications rather than individual users. For example, when an organization utilizes Oracle IaaS, assorted services and applications within their infrastructure need to interact with Oracle Cloud resources. A service role facilitates this interaction by providing these services with the necessary permissions to perform various tasks, such as accessing data, managing resources, or executing specific functions within the cloud environment. This is particularly important for maintaining seamless operations and ensuring that automated tasks can be carried out without manual intervention. The service role is used by system administrators and cloud architects responsible for setting up and maintaining the organization's cloud infrastructure. They configure these roles to ensure that services have just enough permissions to perform required tasks, adhering to the principle of least privilege to enhance security and efficiency within the Oracle Cloud environment.

In accordance with one or more embodiments, service roles may be assigned to operators who need access to certain cloud resources. For example, in cases where an operator is responsible for both the hands-on management and automation of cloud resources, assigning a service role to an operator may be necessary. This is particularly relevant for developers or system administrators who are involved in the development of or troubleshooting automated processes. They might temporarily assume a service role to better understand the access and limitations that the automated service experiences, aiding in the fine-tuning of the service's permissions. Placing temporal restrictions on access to resources using a service role is desirable due to the sensitive nature of the resources involved. For example, in automation scenarios within large organizations, operators might initiate automated scripts or tools that require service role privileges for execution. In such cases, the initiating user would adopt the service role for the duration of that specific task. Some roles may have limited availability and be restricted to use at certain times of the day, for example, during non-peak hours, to avoid disrupting operations. Both start and end time may be indicated in the request for activation or may be preconfigured in the system. Temporal privileges may also be configured in other ways, such as time from activation, or even periodically (e.g., every first Sunday of the month between the hours of 10:30 p.m. and 12:00 a.m.).

In accordance with one or more embodiments, role container 1100 may include an application role such as application role 1120. Application roles are designed primarily for applications within the cloud environment. This role defines the permissions and access levels for applications, determining what actions they can perform within the cloud infrastructure. For example, an application role might grant an application the ability to read data from a database, write logs, or interact with other cloud services.

Typically, application roles are used when an organization deploys and manages applications in the Oracle cloud. These roles are assigned to the applications themselves rather than to individual users, enabling these applications to operate within the cloud environment autonomously, following predefined permissions and constraints. The roles ensure that applications have access limited to the resources necessary for its functionality.

However, there are certain circumstances where an application role might be assigned to an individual. This may occur during the development or testing phases of an application, for example. Developers or other technology professionals, while creating or testing an application, might assume the application role to gain a deeper understanding of how the application interacts with other cloud resources. This approach allows them to experience firsthand the permissions and limitations set on the application, ensuring that the application operates as intended and within the security parameters. Like service roles, it is helpful to have temporal boundaries that limit access once the development and testing phases are complete, with the application role reverting to being assigned solely to the application itself for operational use.

In accordance with one or more embodiments, role container 1100 may include a domain role such as domain role 1130. A domain role is linked to an identity domain, serving as a mechanism to manage user access and permissions. An identity domain acts as a security boundary, containing users, groups, and roles. Domain roles define user permissions regarding the visibility and interaction with cloud resources. For example, domain roles may be used to provide permissions for a variety of activities, such as accessing databases or changing network configurations. Administrators use domain roles to control access rights within the cloud environment efficiently. They assign roles based on the specific requirements of users' job functions. For example, a user responsible for network management may be assigned a domain role for managing the resources within the identity domain containing the role, such as managing roles for users and groups.

In accordance with one or more embodiments, role container 1100 may include types of roles other than service roles, domain roles, and application roles. For example, operators may select additional role types that are already defined or may create custom roles that define specific permissions based on unique requirements to grant the needed level of access. Role container is extensible, meaning that it can accommodate additional roles of various types as needed, allowing for adaptation without the requirement to specify the number or types of roles it holds in advance.

In accordance with an embodiment, a role container may be referred to as a privileged role or as a business role, depending on the requirements associated with obtaining and activating the role. A privileged role and a business role can be distinguished from one another by the workflow requirements of each. A privileged role requires an activation workflow, whereas a business role does not require an activation workflow. In addition, a privileged role typically has an assignment workflow, but a business role does not require, though it may have, an assignment workflow. For example, a privileged role may be required to access sensitive information such as a large set of financial information. An operator may request that this role be assigned to him or her; this will trigger an assignment workflow. However, to use the assigned role, the user would need to request that the role be activated, triggering a second workflow. By contrast, a business role may be assigned directly and used without the need for an activation workflow. Alternatively, a business role may be requested and assigned using an assignment workflow then used without the need for an activation workflow. This distinction highlights the reason that business roles are more appropriate for read-only access to widely used or common resources; in contrast, using privileged roles to control access to sensitive resources is preferred.

In an embodiment, a role may be assigned to a group, a user, a service, or any combination thereof. For example, if three operators are assigned to a group, when a role is assigned to a group, each operator becomes associated with that role. The system can be configured to allow a member of the group to request role assignment or activation for the group. Alternatively, the system may be configured to allow members of the group to request role assignment or activation for themselves and not for others.

In accordance with an embodiment, a role container may include conditional roles. A conditional role is assigned to an operator if the associated conditions are met even though the associated role container has already been assigned to the operator. A conditional role can be conditioned on one or more conditions. For example, a role container may include a conditional service role, another service role that is not conditional, and a domain role. A condition associated with the conditional role is that the operator be a direct report of a particular manager named Robert Smith. Although the role container is assigned to the operator and that role container includes the conditional service role, the role will not be assigned to the operator unless the operator reports to Robert Smith.

In accordance with an embodiment, a role container may include a requestable role. A requestable role is assigned to an operator if the operator has requested the role via a request workflow, and the workflow results in an approval even though the associated role container has already been assigned to the operator. For example, a role container may include a service role, a requestable application role, and a domain role. The workflow may require approval from the operator's manager and the operator's director. Although the role container is assigned to the operator and that role container includes the requestable service role, the role will not be assigned to the operator unless the requirements of the approval workflow are satisfied.

In accordance with an embodiment, a requestable role may be automatically assigned if there is no workflow associated with the role. This is helpful for audit purposes. For example, if an operator requests that a requestable role be assigned to him and there is no assignment workflow associated with the requestable role, then the role will be automatically assigned. In addition, the interaction (request and approval) will be logged for audit purposes.

In accordance with an embodiment, assignment of a role may be conditional, while activation of the role may be requestable. For example, the conditional service role previously discussed may be assigned to the operator because the conditions are satisfied (e.g., the operator reports to Robert Smith). However, if activation is requestable the operator will need to make a request that triggers an activation workflow to activate the role.

In accordance with an embodiment, different operators may be assigned the same role container with the role container that includes a requestable role. A first operator may request the requestable role, and that requestable role may be activated for the first operator without the role being activated for a second operator associated with the same role container. The second operator would need to request that the requestable role be activated for him separately. In another embodiment, an operator may be able to request that a requestable role be activated for an entire group, resulting in group activation of the requestable role.

In accordance with an embodiment, any role container or role within a role container may be temporally bound, meaning that either access or assignment will expire within a pre-determined amount of time. In addition, the type of expiration (access or assignment) and duration of access may be conditional or based on workflow input. For example, an operator may need access to certain resources infrequently, so assignment will expire. However, an operator needing frequent access to the resources may continue to have a role or role container assigned although access will expire.

In an embodiment, a role container may include or be associated with more than one role of the same type or multiple roles of diverse types. A role container may be comprised of any number of roles in a variety of combinations and permutations. For example, role container 1100 includes service role 1110, application role 1120, and domain role 1130. In an embodiment, role container 1100 may contain more roles not shown in FIG. 11. In addition, there is no limit to the distinct types of roles that may be included in a role container. For example, new role types may be defined, prepared, and included in a role container along with service roles, application roles, and domain roles.

Figure 12:
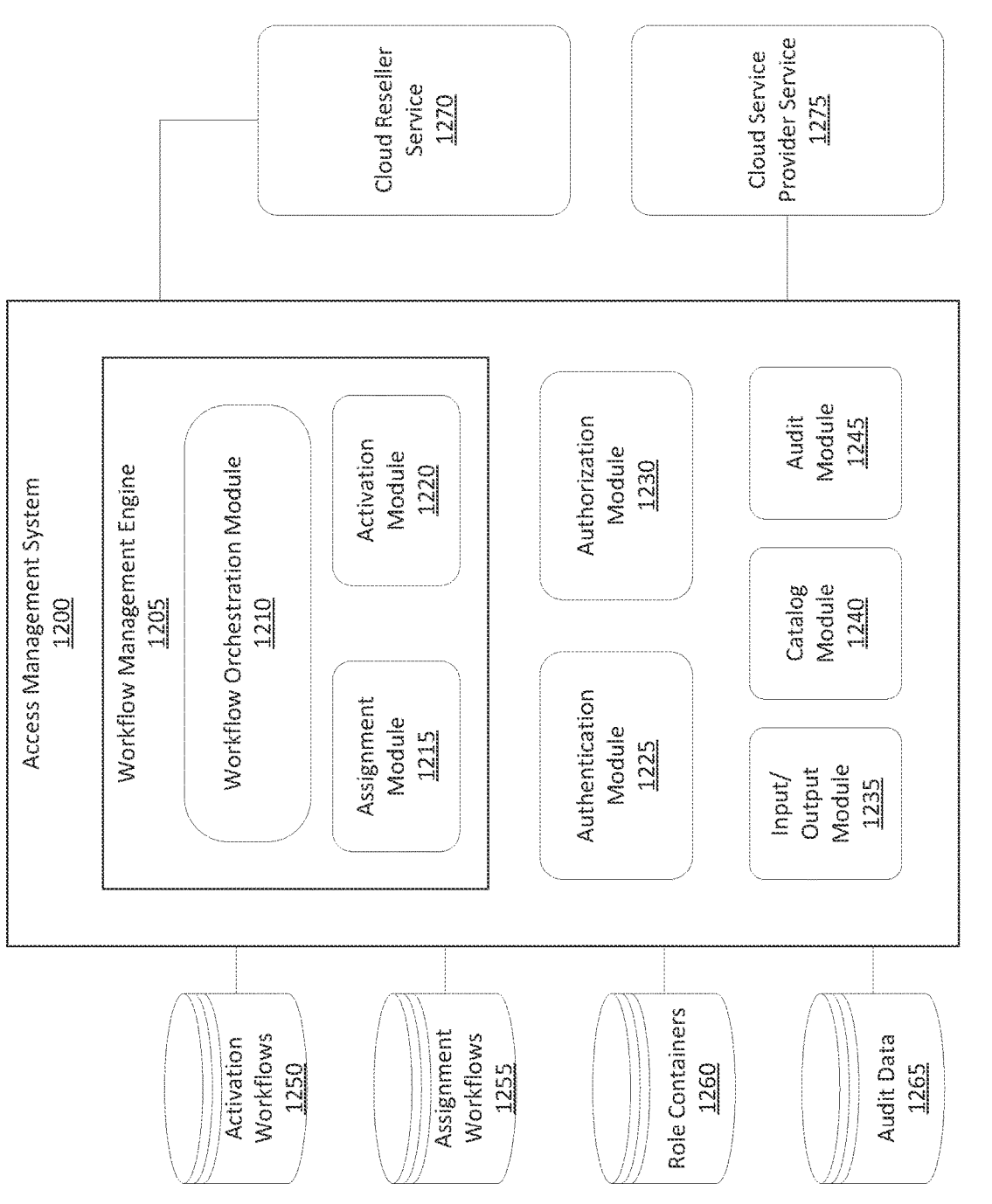
FIG. 12 illustrates a system for managing access to resources in a cloud computing environment using role containers in accordance with one or more embodiments.

FIG. 12 illustrates a system for managing access to resources in a cloud computing environment using role containers in accordance with one or more embodiments. As illustrated in FIG. 12, access management system 1200 includes workflow management engine 1205, authentication module 1225, authorization module 1230, input/output module 1235, catalog module 1240, and audit module 1245. Workflow management engine 1205 includes workflow orchestration module 1210, assignment module 1215, and activation module 1220. Connected to access management system are storage systems for activation workflows 1250, assignment workflows 1255, role containers 1260, and audit data 1265. Cloud reseller service 1270 and cloud service provider service 1275 also interface with access management system 1200.

In accordance with one or more embodiments, workflow management engine 1205 is responsible for ensuring that workflow-related requests are handled properly. Although FIG. 12 shows workflow management engine 1205 as a subsystem of access management system 1200, its modules may be directly managed by access management engine 1200 or as part of a separate system. Workflow management engine 1205 includes workflow orchestration module 1210, assignment module 1215, and activation module 1220.

In accordance with one or more embodiments, workflow orchestration module 1210 manages the automated execution of tasks within a predefined workflow, ensuring that tasks are carried out in sequence and in accordance with specific dependencies. This process starts with the analysis of the workflow to determine the order that tasks should be executed, considering interdependencies. The orchestrator then triggers tasks at the appropriate time, in a distributed and parallel manner in some cases, to optimize the workflow's overall efficiency. Workflow orchestration module 1210 dynamically allocates and manages cloud resources, such as CPU, memory, and storage to meet the varying demands of each task. The orchestrator also monitors the execution of tasks, handling failures and retries as necessary, and ensures that if a task fails or encounters an error, it can be attempted again, or the workflow can be adjusted accordingly. In an embodiment, workflow orchestration module 1210 maintains the state of the workflow, keeping track of the tasks that have been completed as well as the tasks that are still pending. Additionally, workflow orchestration module 1210 considers network latency and data transfer costs.

In accordance with one or more embodiments, assignment module 1215 manages the assignment of roles and role containers to operators and groups. When a role or role container is requested, assignment module checks to see if there is a mapping from the requested role or role container to one or more of the workflows stored in assignment workflows 1250. If more than one workflow is mapped to the role or role container, then assignment module 1215 determines the workflows that should be triggered based on metadata associated with the request for activation. For example, an operator that is associated with a cloud reseller may trigger a workflow that is different from a workflow that would be triggered for an operator associated with a cloud service provider. This is particularly true when a cloud service provider operator is attempting to access resources associated with the cloud reseller because approval may be needed from others within both organizations, and constraints governing if or when changes to the one or more resources requested by the one entity may be implemented are set by another entity.

For example, the cloud environment may include a first resource, and an administrative tenancy corresponding to the cloud environment may include identity resources for the cloud environment. An administrative tenancy may include a first identity domain managed by the cloud reseller and a second identity domain managed by the cloud service provider. In such a case, constraints governing if or when changes to the one or more resources requested by the cloud service provider may be implemented are set by the cloud reseller. The entities may even have separate identity providers. For example, the administrative tenancy may include a first identity domain federated with a first identity provider associated with the cloud service provider and a second identity domain federated with a second identity provider associated with the cloud reseller. In an embodiment, more than one tenancy may exist in a cloud environment, i.e., a first tenancy may be associated with a first subscription managed by a first entity, and a second tenancy in the same cloud environment may be associated with a second subscription managed by a second entity. In one or more embodiments, traversing the workflow may result in any number of approval requests to users of differing identity domains or identity domains in different tenancies. However, if a cloud reseller operator is attempting to access a resource associated with the cloud reseller, the associated workflow would be unlikely to include approval requirements associated with the cloud service provider. In one embodiment, assignment module 1215 includes a user interface that allows for creating, mapping, and storing assignment workflows.

In accordance with one or more embodiments, activation module 1220 manages the assignment of roles and role containers to operators and groups. When a role or role container is requested, assignment module checks to see if there is a mapping from the requested role or role container to one or more of the workflows stored in activation workflows 1255. If more than one workflow is mapped to the role or role container, then activation module 1220 determines the workflows that should be triggered based on metadata associated with the request for activation. As with assignment workflows, for example, an operator that is associated with a cloud reseller may trigger a workflow that is different from a workflow that would be triggered for an operator associated with a cloud service provider. In an embodiment, activation module 1220 includes a user interface that facilitates creating, mapping, and storing assignment workflows. Assignment module 1215 and activation module 1220 are logically and/or physically separated in an embodiment for security purposes. In another embodiment, the functionality of assignment module 1215 and activation module 1220 may be combined though the combined module would still need to maintain and trigger assignment workflows 1250 and activation workflows 1255 separately.

In an embodiment, assignment module 1215 and activation module 1220 interact with workflow orchestration module 1210 in the same manner. For example, assignment module 1215 instructs workflow orchestration module 1210 to execute the selected workflow and waits for a response from workflow orchestration module 1210. The response will typically indicate success or failure although the workflow orchestration module may provide periodic status updates, error codes, retry information, or inform assignment module 1215 (or activation module 1220) that an alternate workflow has been selected according to the rules associated with the initial workflow. Other mechanisms may be used to trigger alternate workflows in an embodiment. For example, activation module 1220 may provide a set of two or more activation workflows 1255 to workflow orchestration module 1210 in an embodiment. These workflows may be ranked based on the management level required to successfully execute the workflow or based on any other criteria.

In accordance with one or more embodiments, any manner of metadata may be used by assignment module 1215 and activation module 1220 to determine the workflow to choose in response to a request for assignment or activation. As discussed above, an operator working for a cloud reseller may trigger a different workflow than an operator working for a cloud service provider. This reporting relationship would be evident in the request metadata that includes a unique identifier associated with the operator. As another example, an independent auditor may require access to the same resources, but a different level of approval may be required, resulting in the use of a different workflow. In other embodiments, there may be a one-to-one mapping between a role and an assignment workflow, a role and an activation workflow, a role container and an assignment workflow, and/or a role container and an activation workflow.

In accordance with one or more embodiments, authentication module 1225 serves as the primary mechanism for verifying the identity of operators attempting to access resources. In an embodiment, authentication module 1225 operates in conjunction with an Identity and Access Management (IAM) system to ensure that operators are who they claim to be. Using protocols such as OAuth2, OpenID Connect, and SAML, the authentication module facilitates a secure exchange of credentials between operators and the cloud infrastructure. Upon receiving a login request, it leverages multi-factor authentication (MFA) techniques, including something the operator knows (password), something the operator has (security token), and something the operator is (biometric verification) to enhance security. Once the operator's identity is authenticated, the module communicates with the IAM system to grant a session token, thereby allowing access to the cloud environment under a secured context.

In accordance with one or more embodiments, authorization module 1230 determines the level of access and privileges an authenticated operator has within the cloud computing environment. Working with the IAM system, it evaluates the policies and roles assigned to an operator to delineate the scope of actions and resources accessible to them. In an embodiment, authorization module 1230 utilizes attribute-based access control (ABAC), role-based access control (RBAC), and policy-based access control (PBAC) mechanisms to enforce security policies and ensure that operators are restricted to interacting with resources pertinent to their role and permissions. The interaction between the authorization module and the IAM system allows for dynamically adjusting access rights based on the operator's context, role changes, or modifications in the security policies.

In accordance with an embodiment, input/output module 1235 serves as the primary interface for data entering and exiting access management system 1200, managing the flow and integrity of data. This data may include requests for authentication, authorization, role or role container assignment, or activation. Other data may include data associated with the creation of workflows, roles, and role containers 1265. Requests may also include requests for reporting, for example, based on audit data 1265. This module may accommodate a wide range of data sources and formats to facilitate integration and communication within the access management system 1200 architecture.

In an embodiment, an input handler within input/output module 1235 includes a data ingestion framework capable of interfacing with various data sources, such as databases, APIs, file systems, and real-time data streams. This framework is equipped with functionalities to handle different data formats (e.g., CSV, JSON, XML) and efficiently manage large volumes of data. It includes mechanisms for batch and real-time data processing that enable the input/output module 1235 to be versatile in different operational contexts, whether processing historical datasets, streaming data, or handling interactions related to workflow orchestration by workflow orchestration module 1210.

In accordance with an embodiment, input/output module 1235 manages data integrity and quality as it enters the system by incorporating initial checks and validations. These checks and validations ensure that incoming data meets predefined quality standards, like checking for missing values, ensuring consistency in data formats, and verifying data ranges and types. This proactive approach to data quality minimizes potential errors and inconsistencies in later stages of the access management processes.

In an embodiment, an output handler within input/output module 1235 includes an output framework designed to handle the distribution and exportation of output. Using the output framework, input/output module 1235 may format these outputs into user-friendly and accessible formats, such as reports, visualizations, or data files compatible with other systems. Input/output module 1235 also ensures secure and efficient transmission of these outputs to end-users or other systems in an embodiment and may employ encryption and secure data transfer protocols to maintain data confidentiality and security.

In accordance with an embodiment, a data preprocessing module transforms data into a format suitable for use by other modules in access management system 1200. For example, the data preprocessing module may transform raw data into a normalized or standardized format suitable for ingestion by workflow orchestration module 1210 and for processing new data inputs requesting authentication, authorization, assignment, or activation. In an embodiment, the data preprocessing module acts as a bridge between the raw data sources (e.g., assignment workflows 1250, activation workflows 1255, role containers 1260, and audit data 1265) and the analytical capabilities other modules used for analyzing, reporting, and creating workflows, roles, and role containers.

In accordance with one or more embodiments, catalog module 1240 manages a catalog of roles, role containers, and workflows. The catalog module may include an interface or API accessible to authenticated operators via input/output module 1235. In an embodiment, catalog module 1240 provides operators with a list of requestable roles and requestable role containers. As an example, an operator may be assigned a role container that includes multiple roles, some that are requestable. The operator may view, via a user interface associated with catalog module 1240, a list of roles and role containers currently assigned to the operator, including a list of requestable roles associated with the role container. From the interface, the operator may request activation of one or more of those roles that are passed to activation module 1220 to trigger the appropriate activation workflow via workflow orchestration module 1210. In an embodiment, the operator may be able to view a list of role containers not currently assigned to the operator but that are available for assignment. The operator may request, using catalog module 1240, that an available role container be assigned to him or her. This request is passed to assignment module to select and trigger the appropriate assignment workflow via workflow orchestration module 1210. If assigned, the role container may still require activation for the operator to perform any associated tasks if the role container is a privileged role. Even then, the role container may include a requestable role that separately needs to be activated.

In accordance with one or more embodiments, audit module 1245 logs and tracks requests related to authentication, authorization, role assignments, and other activities performed by operators. This module works in conjunction with other modules in the access management system 1200 to collect and store logs that document the specifics of requests. This includes various information, such as the time of the request, the identity of the operator making the request, the nature of the request, and its outcome. Audit module 1245 utilizes logging mechanisms to gather this data that is then stored in a secure, centralized database for analysis and review. One function of the audit module is to provide a historical record of interactions with the cloud infrastructure, facilitating the investigation of security incidents and compliance with regulatory standards. Interaction with access management system 1200 modules allows for the correlation of log data with specific operator identities, roles, and role containers, enabling administrators to identify patterns of behavior or potential security breaches. Audit module's 1245's primary role is to ensure that operator actions within the cloud environment are recorded and available for review, thereby supporting accountability and traceability of operations. However, audit module 1245 may also be configured to track and report on other types of interactions with access management system 1200, such as communications related to workflow orchestration and network traffic between access management system 1200 and other systems.

In accordance with one or more embodiments, one or more data repositories include storage for activation workflows 1250, assignment workflows 1255, role containers 1260, and audit data 1265. Activation workflows 1250, assignment workflows 1255, role containers 1260, and audit data 1265 may be physically separated or logically separated from one another, depending on the configuration of the repository or repositories. Each repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as access management system 1200. Additionally, or alternatively, a data repository may be implemented or executed on a computing system separate from access management system 1200. The data repository or repositories may be communicatively coupled to access management system 1200 via a direct connection or via a network.

In accordance with one or more embodiments, cloud reseller service 1270 represents a service associated with a cloud reseller entity, and cloud service provider service 1275 represents a service associated with a cloud service provider entity. Access management system 1200 controls access to resources associated with both cloud reseller service 1270 and cloud service provider service 1275 although the workflows, roles, and role containers required to access those services may differ due to entity-specific rules.

In accordance with one or more embodiments, cloud reseller service 1270 and cloud service provider service 1275 might represent any number of services such as compute services responsible for executing application code. This includes virtual machines and containerized applications, where the underlying infrastructure provides CPU, memory, and runtime environments necessary for code execution. These services may also be storage services that manage data storage and retrieval in the cloud. They encompass databases, file storage systems, and object storage services that allow operators to store, organize, and access data efficiently. Networking services may also be associated with different entities, and they enable the setup and management of network resources in the cloud, including virtual private networks (VPNs), load balancers, and DNS services. These services ensure secure and efficient data transmission between various parts of the cloud infrastructure and between the cloud and external systems. Other service types may include API management services that enable operators to create, publish, and manage APIs that provide access to functionality within the cloud infrastructure or access to Identity and Access Management (IAM) Services that manage entity-specific user identities, permissions, and access controls, ensuring that access to certain parts of the cloud infrastructure is restricted to authorized personnel.

4. Managing Privileged Access to Resources

Figure 13:
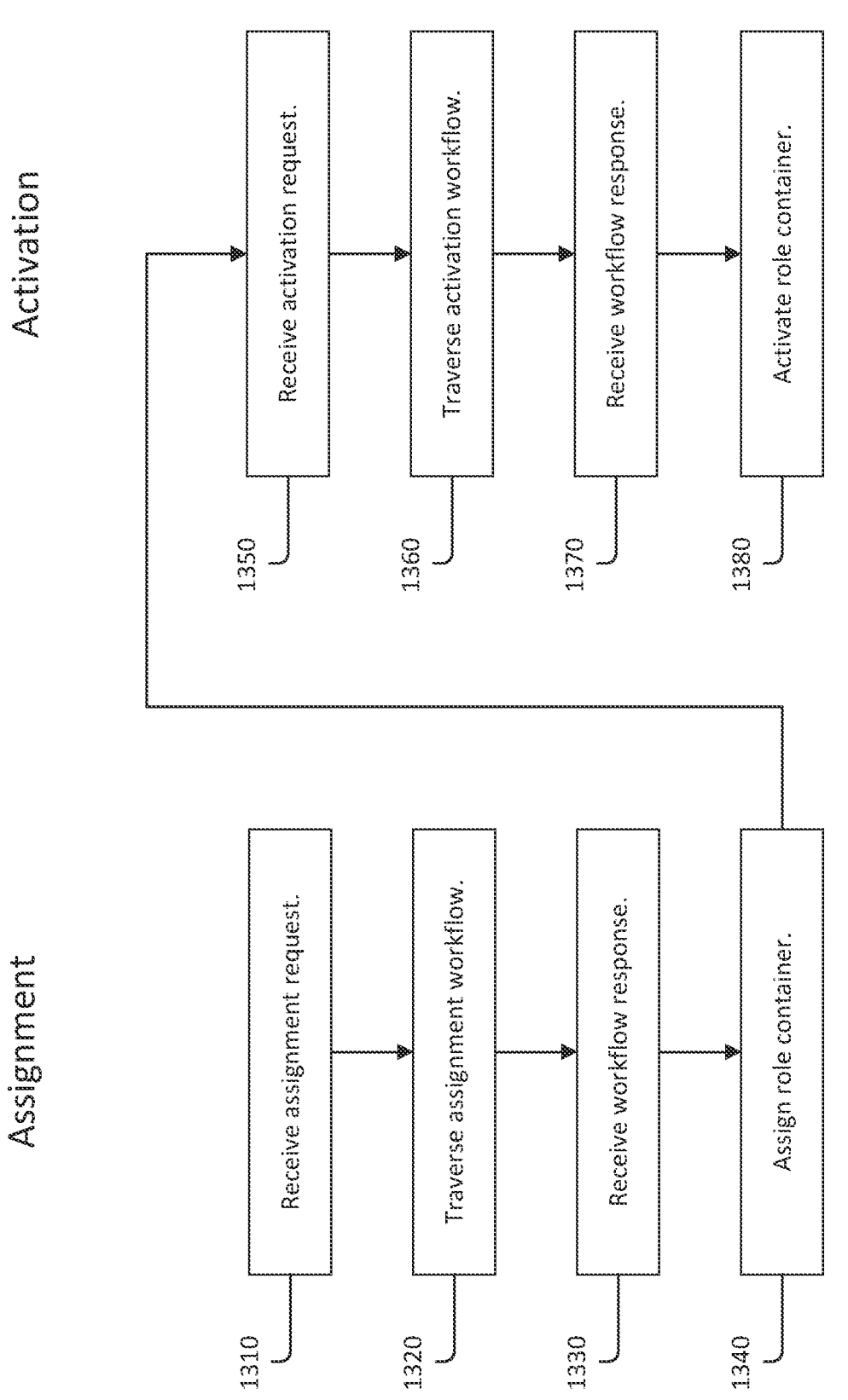
FIG. 13 illustrates an example set of operations for assigning and activating a role container in accordance with one or more embodiments.

FIG. 13 illustrates an example set of operations for assigning and activating a role container in accordance with one or more embodiments. One or more operations illustrated in FIG. 13 may be modified, rearranged, or omitted. Accordingly, the particular sequence of operations illustrated in FIG. 13 should not be construed as limiting the scope of one or more embodiments.

In an embodiment, the access management system 1200 receives an assignment request from an operator (Operation 1310). In the illustrated embodiment, the assignment request is a request for a role container that is a privileged role to be assigned to an operator although similar requests can be made for role containers that are business roles or for individual roles. The request may be received, for example, via input/output module 1235.

An assignment workflow is then traversed (Operation 1320). Traversing an assignment workflow includes first selecting an assignment workflow. In an embodiment, this selection process is performed by assignment module 1215, and the workflow is selected from assignment workflows 1250. The selection process further includes matching the request to one or more assignment workflows. For example, metadata associated with the request may indicate that the request is for a database administrator privileged role, and this role container requires both an assignment and an activation workflow. The metadata may also indicate that that the role is being requested by a cloud service provider operator, and the privileged role being requested provides access to resources associated with and controlled by a cloud reseller. The role may be associated with two assignment workflows, one for cloud service provider operators and the other for cloud reseller operators. In such a case, the assignment workflow for cloud service provider operators would be selected and traversed. Traversal of the assignment workflow is performed by workflow orchestration module 1210 in an embodiment. This involves ingesting the workflow to perform an analysis of the operations involved, dependencies, and other workflow attributes. For example, the first step of the workflow may require that one person from a group of people approves the request, and the second step of the workflow may require a similar approval from a different group of people.

A workflow response is then received (Operation 1330). In an embodiment, the workflow response is received from workflow orchestration module 1210 by assignment module 1215. The workflow response includes information about the state of the workflow traversal. For example, status updates regarding the workflow traversal may include indications that the workflow is waiting on a certain step in the workflow, the workflow is completed, or that the workflow could not be completed. If the workflow is completed, the response may indicate if the workflow resulted in an approval or denial. If the assignment is denied, the workflow response may indicate the step in the workflow that resulted in denial and could include escalation or appeal information such as the name of the operator who denied the request. In the embodiment illustrated, it is assumed that the request was granted.

Once the request for assignment of the privileged role is granted, the role container is assigned (operation 1340). To do this, access management system 1200 associates the specified privileged role with the operator's identity. This association is typically stored in a directory service that maintains a record of identities and the corresponding roles of the identities within the cloud environment. The directory service ensures that this information is consistently accessible across the cloud infrastructure, enabling assorted services to query and retrieve role information as needed. In an embodiment, the privileged role (a type of role container) includes a set of roles, such as application roles, service roles, or domain roles. Each of these roles may be requestable or conditional, as this designation is not dependent on the type of role container. In an embodiment, each role in the role container is individually associated with the operator's identity in the directory service. Since this is a privileged role, however, the ability to interact with resources associated with the privileged role (and its associated roles) will not take effect until the privileged role is activated.

Once the privileged role has been assigned, the operator can request activation of the role. In an embodiment, activation is not automatically requested, so any amount of time can pass before the operator makes a request to activate the privileged role. This is because for security purposes, operators and administrators prefer that access to critical resources is limited to the time period when access is needed to perform a task. Once the operator makes a request for activation of the privileged role, the activation request is received by the access management system 1200 (Operation 1350). The request may be received, for example, via input/output module 1235, and passed to activation module 1220 in workflow management engine 1205.

An activation workflow is then traversed (Operation 1360). Traversing an activation workflow includes first selecting an activation workflow. In an embodiment, this selection process is performed by activation module 1220, and the workflow is selected from activation workflows 1255. In an embodiment, no workflow is required because standing approval is indicated rather than a workflow. Standing approval may be conditional, for example, if members of a group or team are permitted activation. Standing or automatic approvals are still logged and are approved once requested. Assuming no standing approval, the selection process further includes matching the request to one or more assignment workflows. For example, metadata associated with the request may indicate that the request is for a privileged role. The metadata may also indicate that that the role is being requested by a cloud service provider operator, and the privileged role being requested provides access to resources associated with and controlled by a cloud reseller. The role may be associated with two activation workflows, one for cloud service provider operators and the other for cloud reseller operators. In such a case, the activation workflow for cloud service provider operators would be selected and traversed. Traversal of the activation workflow is performed by workflow orchestration module 1210 in an embodiment. This involves ingesting the workflow to perform an analysis of the operations involved, dependencies, and other workflow attributes. For example, the first step of the workflow may require that one person from a group of people approves the request, and the second step of the workflow may require a similar approval from a different group of people.

A workflow response is then received (Operation 1370). In an embodiment, the workflow response is received from workflow orchestration module 1210 by activation module 1220. The workflow response includes information about the state of the workflow traversal. For example, status updates regarding the workflow traversal may include indications that the workflow is waiting on a certain step in the workflow, the workflow is completed, or that the workflow could not be completed. If the workflow is completed, the response may indicate if the workflow resulted in an approval or denial. If the assignment is denied, the workflow response may indicate the step in the workflow that resulted in denial and could include escalation or appeal information such as the name of the operator who denied the request. In the embodiment illustrated, it is assumed that the request was granted.

Once the request for activation of the privileged role is granted, the role container is activated (Operation 1380). To do this, access management system 1200 associates the activation status of the specified privileged role with the operator's identity. This association is typically stored in a directory service that maintains a record of identity and its corresponding role within the cloud environment including activation status. Once the privileged role is activated, the operator will be able to interact with the resources associated with the privileged role. However, if any of the roles included in the privileged role are conditional or requestable, the requirements of those roles would need to be satisfied before access to resources associated with the conditional or requestable roles is granted.

In an embodiment, roles that are assigned but not yet active are not stored in the directory service. Instead, they are stored in a separate storage system or assignment directory while they are pending activation. In this case, roles would be stored in the directory once they have been activated and would be removed when they are not active.

5. Example Embodiment

A detailed example is described below for purposes of clarity. Components and/or operations described below should be understood as one specific example that may not be applicable to certain embodiments. Accordingly, components and/or operations described below should not be construed as limiting the scope of any of the claims.

Figure 14:
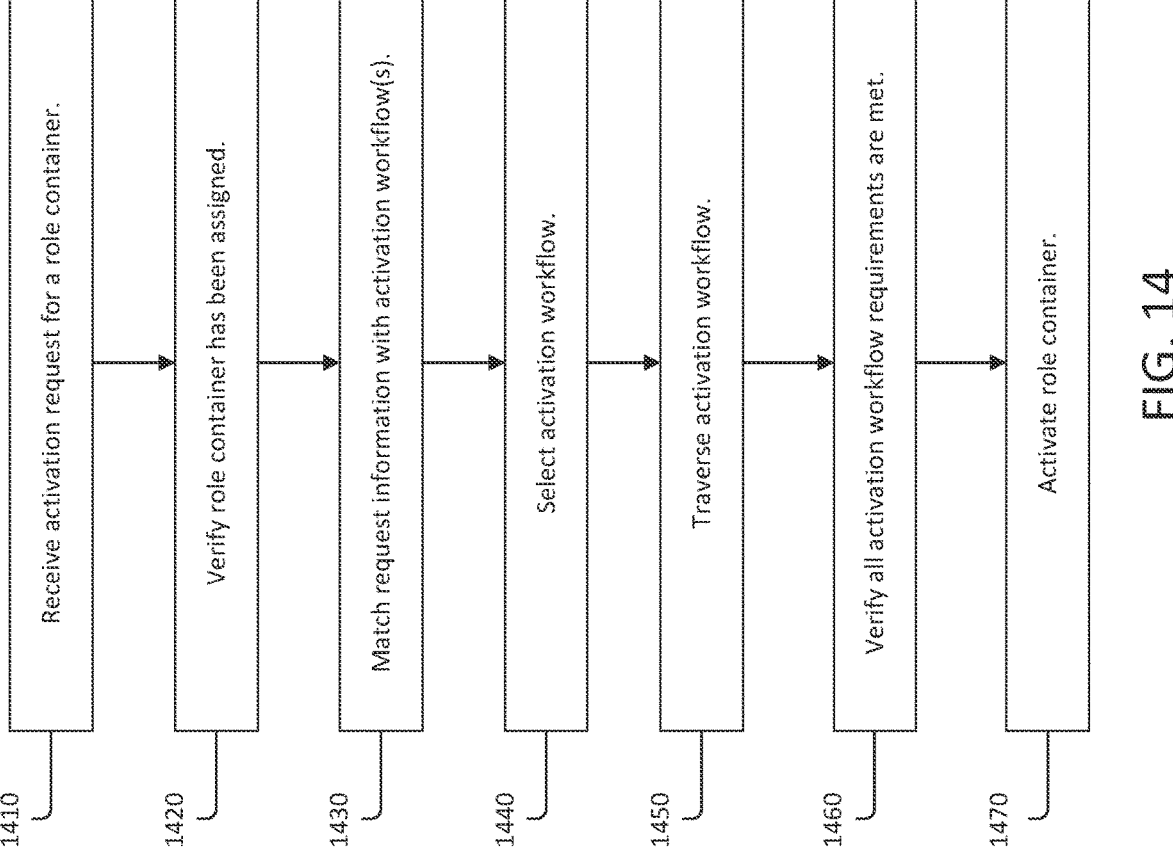
FIG. 14 illustrates an example set of operations for activating a role container in accordance with one or more embodiments.

FIG. 14 illustrates an additional example set of operations for activating a role container in accordance with one or more embodiments. An activation request for a role container is received (Operation 1410). The activation request includes metadata that indicates the operator requesting the activation and the role that is to be activated if the request is successful. In this case, the role container is also recognized as a privileged role that includes multiple roles and permissions, allowing access to certain resources in a cloud environment. For example, the role may allow a cloud service provider operator to access resources in a cloud reseller environment. Other metadata may be included, such as the organization that the operator belongs to, such as a cloud service provider, a cloud reseller, or an independent third-party auditor. The request may be received via input/output module 1235 and passed to activation module 1220 in workflow management engine 1205.

Once the request is received, activation module 1220 verifies that the role container has already been assigned (Operation 1420). The verification process includes checking the directory or storage where relationships between operators and roles are stored. If the role container has not yet been assigned to the operator, then the activation request will be denied since the assignment workflow is separate from the activation workflow. If the directory shows a match between the privileged role and the operator, then verification is noted by activation module 1220, and the request management is allowed to proceed to the next step. This is in addition to the logging of the verification of activation noted by audit module 1245 in audit data 1265, as audit module 1245 is configured to log the step of the assignment and activation process in an embodiment.

The request information is then matched with an activation workflow (Operation 1430). This matching operation includes matching the privileged role identified in the request to one or more assignment workflows. For example, metadata associated with the request may indicate that the request is for a privileged role meant for database administration. Metadata may also include a justification for the activation request that may be provided to approvers and stored in audit data 1265. In addition, metadata may include an activation time period that specifies when activation of the privileged role should begin and when it should end, resulting in temporal permissions. The metadata may also indicate that that the role is being requested by a cloud service provider operator, and the privileged role being requested provides access to resources associated with and controlled by a cloud reseller. The metadata can indicate these attributes directly or indirectly, meaning it can provide explicit information about the attributes or allow for the inference of details through analysis of related data points. Direct indications are straightforward, where the metadata explicitly lists attributes, such as operator organization, purpose of the privileged role, manager identifier, and target resource organizational association. Indirect indications require interpretation or correlation with other data such as deducing the resource organization association from the role container.

An activation workflow is then selected (Operation 1440). The role may be associated with two activation workflows, one for cloud service provider operators and the other for cloud reseller operators. In such a case, the activation workflow for cloud service provider operators would be selected because the requesting operator's identifier is associated with the cloud service provider. In an embodiment, the workflow is selected in response to determining certain conditions are met. For example, the workflow may be selected in response to determining that one or more of the following conditions are met: a) the activation workflow is associated with the role container; b) the activation workflow is associated with a user group that includes the user or users making the request or associated with the request; or c) the activation workflow is associated with an identity domain that includes the user or users making the request.

Once the activation workflow is selected, it is traversed (Operation 1450). Traversal of the activation workflow is performed by workflow orchestration module 1210 in an embodiment. This involves ingesting the workflow to perform an analysis of the operations involved, dependencies, and other workflow attributes. For example, the first step of the workflow may require that one person from a group of people approves the request, and the second step of the workflow may require a similar approval from a different group of people.

Figure 15:
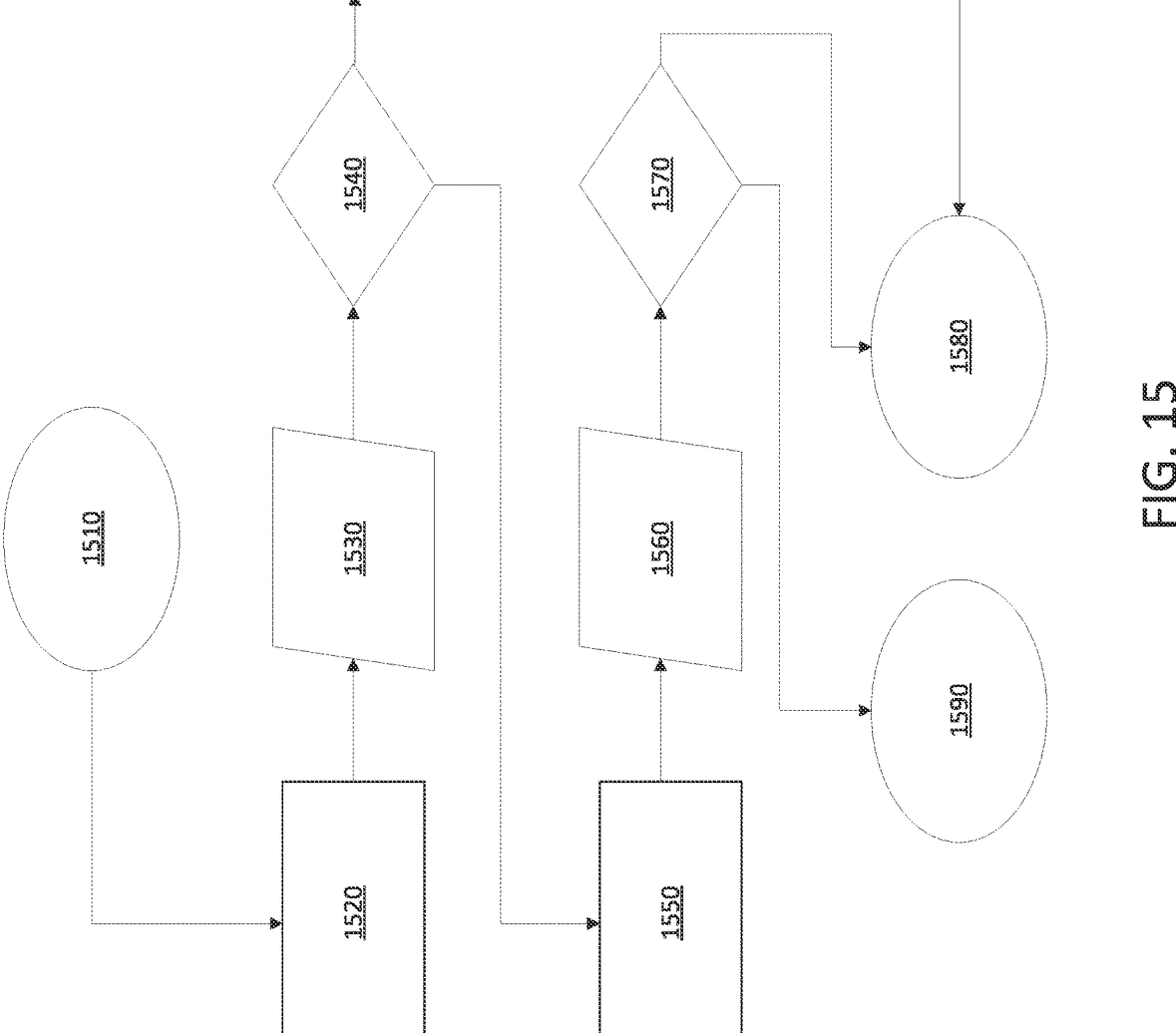
FIG. 15 illustrates an example of a workflow in accordance with one or more embodiments.

FIG. 15 illustrates an example of a workflow in accordance with one or more embodiments. The workflow begins (Operation 1510). Workflow orchestration module 1210 makes a request to a service configured to collect approvals associated with the role request. This request may include information about the operator, the privileged role the operator is requesting, and various rules associated with the workflow requirements. The service may be external to the system or may be part of workflow orchestration module 1210. In an embodiment, the service is cloud service provider service 1275 that represents an approval service associated with cloud service provider operators. Workflow orchestration module 1210 indicates to cloud service provider service 1275 that two people in a group that includes five people associated with the cloud service provider need to approve the request for this step of the workflow to be satisfied.

In an embodiment, a workflow element may be variable. For example, the workflow may include a variable for an approval entity called <manager>. In this case, the requestor's manager would be considered the appropriate approval entity for that step in the workflow. The result is that the same workflow may be used for different operators, and for each operator requesting approval, their respective managers will be notified, and approval will be needed from the operator's manager. Any other variable may be used in this manner as long as it is conceivable that a system involved in the process can determine an appropriate value for the variable. For example, access management system 1200 may detect the operator's unique identifier and then access an LDAP directory to determine the identity of the operator's manager.

Cloud service provider service 1275 sends a notification to one or more of the group members, indicating that their attention is requested for purposes of approving the activation request (Operation 1520). This includes executing a notification subroutine that is engineered to interface with the group of operators authorized to render decisions on the request. This notification mechanism leverages a distribution module to ensure that relevant operators are promptly informed that their intervention is required for the approval process. The system is configured to require affirmative responses from at least two operators to deem the approval process as completed successfully.

The service incorporates a monitoring component designed to track the progress of pending approvals and enforce a timeout threshold. Should the requisite number of approvals not be secured within the specified timeframe, the process is automatically flagged as failed due to timeout. Concurrently, a reminder subsystem periodically alerts operators of outstanding requests, thereby minimizing the risk of inadvertent failure to respond. Furthermore, in the event of a timeout, an escalation procedure may be triggered if provided by the approval workflow, elevating the request to a different operator or set of operators to ensure timely resolution.

Members of the group then respond (Operation 1530). Operators can respond to approval requests through a variety of mechanisms, including but not limited to email, a dedicated user interface (UI), and other predefined response channels, such as mobile applications or automated API calls. Response mechanisms are integrated into the approval management service via distinct modules designed to handle the specific data exchange format and protocol associated with that channel.

For responses received via email, the service utilizes an email parsing module that continuously monitors for incoming replies to approval notifications. The service applies logic to extract decision data from the email content, identifying approval or rejection based on pre-established criteria. Upon successful extraction, the decision is recorded. In cases where operators choose the UI for their response, their interactions are captured directly by the UI components. For other response mechanisms, such as mobile applications or direct API integrations, similar principles apply. Mobile applications, for instance, leverage native or web-based interfaces to collect operator decisions that are then sent to the service via APIs designed for mobile data exchange. Direct API calls from external systems allow for automated responses to be submitted programmatically. These API calls are authenticated and validated by the service's backend, ensuring that authorized responses are processed and recorded.

Based on the success or failure, a decision is made (Operation 1540). If the request for approval is successful, then the workflow progresses. Otherwise, the workflow exits with a code describing the reason for failure (Operation 1580).

In response to determining that the first group approved the request, workflow orchestration module 1210 continues workflow execution by making a request to a service configured to collect approvals associated with the role request (Operation 1550). This service may be the same service used previously in the workflow or may be a different service. In an embodiment, the service is cloud reseller service 1270, representing an approval service that interfaces with cloud reseller operators. The request may include information about the operator and the privileged role the operator is requesting as well as various rules associated with the workflow requirements. The service may be external to the system or may be part of workflow orchestration module 1210. Workflow orchestration module 1210 indicates to cloud reseller service 1270 that one person in a group that includes two people associated with the cloud reseller need to approve the request for this step of the workflow to be satisfied.

Cloud reseller service 1270 sends a notification to one or more of the group members, indicating that their attention is requested for purposes of approving the activation request (Operation 1560). This includes executing a notification subroutine that is engineered to interface with the group of operators authorized to render decisions on the request. This notification mechanism leverages a distribution module to ensure that relevant operators are promptly informed that their intervention is required for the approval process. The system is configured to require affirmative responses from at least one operator to deem the approval process as completed successfully. Based on the success or failure, a decision is made (Operation 1570). If the request for approval is successful, then the workflow progresses to final success (Operation 1590). Otherwise, the workflow exits with a code describing the reason for failure (Operation 1580).

Reverting to FIG. 14, once traversal of the activation workflow has been completed, workflow orchestration module 1210 verifies that the activation workflow requirement has been met (Operation 1460). Workflow orchestration module tracks the overall progress of the workflow and organizes execution of the various tasks required to complete the workflow. By controlling the execution of the workflow, workflow orchestration module 1210 can track the status of the tasks, determining if a task has been completed successfully and the requirements of the workflow are met. If the activation workflow requirements have not been met, and the workflow execution has completed, then the activation request will be denied. In the embodiment illustrated in FIG. 14, the activation workflow requirements have been met.

In response to determining that the workflow requirements have been met, workflow orchestration module 1210 provides a workflow response to activation module 1215 indicating successful completion. Activation module 1215 then activates the role container, a privileged role (Operation 1470). Activating the role container includes associating the activation status of the specified privileged role with the operator's identity in a directory service or other storage system. Once the privileged role is activated, the operator will be able to interact with the resources associated with the privileged role. However, if any of the roles included in the privileged role are conditional or requestable, the requirements of those roles would need to be satisfied before access to resources associated with the conditional or requestable roles is granted.

In an embodiment, the operator may now perform operations on or associated with a resource based on the activation of the role container that in this case is a privileged role. For example, the role container may include two roles, each one associated with permissions that allow operators to perform operations on resources. Both the operations and the resources may be different, the same, or have some overlap. Both roles are activated for the operator, and the operator is permitted to perform a first operation on a first resource associated with the first role based on (a) the first role being associated with a first permission to perform the first operation on the first resource, (b) the first role being included in the role container, and (c) the role container being activated for the operator. The operator is also permitted to perform a second operation on a second resource based on (a) the second role being associated with a second permission to perform the second operation on the second resource, (b) the second role being included in the role container, and (c) the role container being activated for the operator.

In accordance with one or more embodiments, the process for performing the assignment of a role or a role container is like the process discussed in connection with FIG. 14 and FIG. 15 for activating a role or role container.

6. Miscellaneous; Extensions

Unless otherwise defined, all terms (including technical and scientific terms) are to be given their ordinary and customary meaning to a person of ordinary skill in the art and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
receiving a first activation request to activate a role container that has been assigned to a first set of one or more users, wherein the role container is in an inactive state for a first user of the set of one or more users prior to the first activation request, wherein the role container comprises a first role;

wherein the first role in the role container is associated with a first permission to perform a first operation on a first resource;

traversing a first activation workflow to activate the role container for the first user;

in response to receiving a workflow response associated with the first activation workflow, activating the role container for the first user;

wherein the first user does not have access rights to perform the first operation on the first resource based on the role container until the role container is activated for the first user.

2. The non-transitory computer readable media of claim 1, wherein the operations further comprise:

receiving an assignment request to assign the role container to the first set of one or more users;

traversing an assignment workflow to assign the role container to the first set of one or more users; and in response to receiving a workflow response associated with the assignment workflow, assigning the role container to the first set of one or more users.

3. The non-transitory computer readable media of claim 2, wherein:

traversing the assignment workflow comprises transmitting a first approval request to a cloud service provider entity;

traversing the first activation workflow comprises transmitting a second approval request to a cloud reseller entity;

the first user corresponds to a cloud service provider entity.

4. The non-transitory computer readable media of claim 1, wherein the operations further comprise:

selecting the first activation workflow from a set of activation workflows to process the first activation request to activate the role container;

wherein the first activation workflow is selected in response to determining that one or more of the following conditions is met:

a) the first activation workflow is associated with the role container;

b) the first activation workflow is associated with a user group comprising the first one or more users; or c) the first activation workflow is associated with an identity domain comprising the first user.

5. The non-transitory computer readable media of claim 4, wherein selecting the first activation workflow comprises:

mapping the attributes of the first activation request to an approver variable, wherein the attributes of the first activation request comprise attributes corresponding to the first user;

determining an approver for the first activation request based on a value of the approver variable; and configuring the first activation workflow based on the approver.

6. The non-transitory computer readable media of claim 1, wherein the role container comprises a plurality of roles including the first role and a second role, wherein the second role in the role container is associated with a second permission to perform a second operation on a second resource, wherein the role container is activated based at least in part on initiating the first activation workflow, wherein activating the role container for the first user results in activating each role in the role container for the first user, and wherein the operations further comprise:

permitting the first user to perform the first operation on the first resource based on (a) the first role being associated with the first permission to perform the first operation on the first resource, (b) the first role being included in the role container, and (c) the role container being activated for the first user; and permitting the first user to perform the second operation on the second resource based on (a) the second role being associated with the second permission to perform the second operation on the second resource, (b) the second role being included in the role container, and (c) the role container being activated for the first user.

7. The non-transitory computer readable media of claim 1, wherein traversing the first activation workflow comprises granting the first activation request based on a standing approval configured for the first activation workflow.

8. The non-transitory computer readable media of claim 1, wherein:

the first activation request comprises activation justification metadata identifying one or more justifications for activation of the role; and the first activation justification metadata is stored in an audit log.

9. The non-transitory computer readable media of claim 1, wherein the role container is activated for a limited time period.

10. The non-transitory computer readable media of claim 1, wherein traversing the first activation workflow comprises:

transmitting an approval request to a first approval entity;

responsive to determining that no response has been received from the first approval entity within a first approval period, transmitting the approval request to a second approval entity; and responsive at least in part to receiving an approval from the second approval entity, activating the role container.

11. The non-transitory computer readable media of claim 1, wherein traversing the first activation workflow comprises:

identifying a variable approval entity element in the first activation workflow; and populating the variable approval entity element with one or more entities based on metadata associated with the first activation request.

12. The non-transitory computer readable media of claim 1, wherein the operations further comprise:

receiving a second activation request to activate the role container for a second user of the first set of one or more users;

traversing a second activation workflow to activate the role container for the second user;

in response to receiving a workflow response associated with the second activation workflow, activating the role container for the second user;

wherein the second activation workflow is different than the first activation workflow.

13. The non-transitory computer readable media of claim 1, wherein the first activation workflow comprises a process that includes a) one or more tasks, b) one or more decision points, and c) logic for making decisions at the decision points.

14. The non-transitory computer readable media of claim 1, wherein the operations further comprise:

receiving a request to activate the first role in the role container assigned to a second user in a second user group; and activating the first role in the role container for the second user without activating the second role in the role container for the second user.

15. The non-transitory computer readable media of claim 1, wherein traversing the first activation workflow comprises:

passing a plurality of approval levels, wherein passing a first approval level of the plurality of approval levels requires approval from at least a subset of a plurality of approval entities.

16. The non-transitory computer readable media of claim 1, wherein:

the role container comprises at least two of:

a service role that is associated with permission to perform an operation on a first resource within an infrastructure as a service environment;

an application role that is associated with permission to perform an application-specific operation; and a domain role that is associated with permission to perform an operation associated with administering a domain.

17. The non-transitory computer readable media of claim 1, wherein:

traversing the first activation workflow comprises transmitting an approval request to a first entity;

the first user corresponds to a second entity.

18. The non-transitory computer readable media of claim 17, wherein the first entity comprises a cloud reseller entity and the second entity comprises a cloud service provider entity.

19. The non-transitory computer readable medium of claim 17, wherein:

a cloud environment includes the first resource;

an administrative tenancy corresponding to the cloud environment includes identity resources for the cloud environment;

the administrative tenancy includes a first identity domain managed by the first entity and a second identity domain managed by the second entity.

20. The non-transitory computer readable medium of claim 17, wherein:

a cloud environment includes one or more resources including the first resource;

constraints governing whether or when changes to the one or more resources requested by the second entity may be implemented are set by the first entity.

21. The non-transitory computer readable medium of claim 17, wherein:

a cloud environment includes one or more resources including the first resource;

access to the one or more resources by the second entity is conditioned at least upon consent granted by the first entity.

22. The non-transitory computer readable medium of claim 17, wherein:

a cloud environment includes a first tenancy including the first resource, and a second tenancy;

the first tenancy is associated with a first subscription managed by the first entity;

the second tenancy is associated with a second subscription managed by the second entity.

23. The non-transitory computer readable medium of claim 1, wherein:

a cloud environment includes the first resource;

an administrative tenancy corresponding to the cloud environment includes identity resources for the cloud environment;

the administrative tenancy includes a first identity domain federated with a first identity provider and a second identity domain federated with a second identity provider;

traversing the first activation workflow comprises transmitting an approval request to a second user within the first identity domain;

the first user is within the second identity domain.

24. A system, comprising:

at least one device including a hardware processor;

the system being configured to perform operations comprising:

receiving a first activation request to activate a role container that has been assigned to a first set of one or more users, wherein the role container is in an inactive state for a first user of the set of one or more users prior to the first activation request, wherein the role container comprises a first role;

wherein the first role in the role container is associated with a first permission to perform a first operation on a first resource;

traversing a first activation workflow to activate the role container for the first user;

in response to receiving a workflow response associated with the first activation workflow, activating the role container for the first user;

wherein the first does not have access rights to perform the first operation on the first resource based on the role container until the role container is activated for the first user.

* * * * *